United States Patent
Pendharkar

(10) Patent No.: US 12,340,415 B2
(45) Date of Patent: Jun. 24, 2025

(54) METHOD AND SYSTEM OF COMMODITY TRADING AND RISK MANAGEMENT

(71) Applicant: Shrirang Pendharkar, Nagpur (IN)

(72) Inventor: Shrirang Pendharkar, Nagpur (IN)

( * ) Notice: Subject to any disclaimer, the term of this patent is extended or adjusted under 35 U.S.C. 154(b) by 0 days.

(21) Appl. No.: 17/741,426

(22) Filed: May 10, 2022

(65) Prior Publication Data

US 2023/0020590 A1    Jan. 19, 2023

Related U.S. Application Data

(60) Provisional application No. 63/186,180, filed on May 10, 2021.

(51) Int. Cl.
*G06Q 40/04* (2012.01)
*G06Q 30/02* (2023.01)
*G06Q 30/0201* (2023.01)

(52) U.S. Cl.
CPC ......... *G06Q 40/04* (2013.01); *G06Q 30/0206* (2013.01)

(58) Field of Classification Search
CPC ............. G06Q 40/04; G06Q 30/0206
USPC ........................................ 705/38
See application file for complete search history.

(56) References Cited

U.S. PATENT DOCUMENTS

| | | | |
|---|---|---|---|
| 8,121,930 B2* | 2/2012 | Kirch et al. | 705/37 |
| 2001/0049634 A1* | 12/2001 | Stewart | 705/26 |
| 2007/0073606 A1* | 3/2007 | Lai | 705/37 |

OTHER PUBLICATIONS

Z. Csapo, L. Karpati, L. Kozar and A. Nabradi, E-learning in Price Risk Management, Jan. 1, 2010, 2010 International Conference on e-Education, e-Business, e-Management and e-Learning, Sanya, China, pp. 451-453, (Year: 2010).*

* cited by examiner

*Primary Examiner* — Scott C Anderson
*Assistant Examiner* — George N. Proios

(57) ABSTRACT

A computerized system for metals trading comprising: a commodity trading and risk management (CTRM) enterprise system comprising: a firewall comprising a network security system that monitors and controls incoming and outgoing network traffic based on a set of predetermined security rules, a gateway comprising a network node configured for interfacing with another network that uses different communication protocols; wherein the CTRM enterprise system is configured to implement a set of trade capture and pricing requirements for a metals commodity, wherein the CTRM enterprise system is configured to use a plurality of application server nodes to perform a plurality of tasks comprising: managing a complex quality-based contract pricing for the metals commodity; calculating and managing a complex formula-based contract penalty with respect to the quality-based contract pricing of the metals commodity; and implement a set of microservice modules that independently perform a set of microservice related to the quality-based contract pricing and the complex formula-based contract penalty of the metals commodity.

3 Claims, 21 Drawing Sheets

METHOD AND SYSTEM OF COMMODITY TRADING AND RISK MANAGEMENT

CLAIM OF PRIORITY

This application claims priority to U.S. Provisional Patent Application No. 63/186,180, filed on 10 May 2021 and titled METHOD AND SYSTEM OF COMMODITY TRADING AND RISK MANAGEMENT. This provisional patent application is hereby incorporated by reference in its entirety.

BACKGROUND

Most CTRM systems cater to basic trade pricing and risk management requirements of metal trades. However, the requirements related to physical metal concentrate trades are quite different than the refined metals. Physical metal concentrate trade has various components (e.g. as the concentrate trade is a mixture of more than one base metal). An example would be Zinc concentrate trade.

In this example it is noted that the Zinc concentrate trade includes Zinc as the major component, along with Silver And/or Gold as additional components. In addition, there can be other impurities as well. Example of impurities can be Silica content, moisture content, Iron (Fe) content, etc. Each of the major components of the concentrate can be priced separately. There can also be complex pricing mechanisms for each component. Also, there are complex quality adjustment related requirements for each of the components and impurities in the metal concentrate. Accordingly, automated and computerized improvements to CTRM systems that cater to the pricing and risk management of physical metal concentrate trades are desired.

SUMMARY OF THE INVENTION

A computerized system for metals trading comprising: a commodity trading and risk management (CTRM) enterprise system comprising: a firewall comprising a network security system that monitors and controls incoming and outgoing network traffic based on a set of predetermined security rules, a gateway comprising a network node configured for interfacing with another network that uses different communication protocols; wherein the CTRM enterprise system is configured to implement a set of trade capture and pricing requirements for a metals commodity, wherein the CTRM enterprise system is configured to use a plurality of application server nodes to perform a plurality of tasks comprising: managing a complex quality-based contract pricing for the metals commodity; calculating and managing a complex formula-based contract penalty with respect to the quality-based contract pricing of the metals commodity; and implement a set of microservice modules that independently perform a set of microservice related to the quality-based contract pricing and the complex formula-based contract penalty of the metals commodity.

BRIEF DESCRIPTION OF THE DRAWINGS

The present application can be best understood by reference to the following description taken in conjunction with the accompanying figures, in which like parts may be referred to by like numerals.

Figure 1:
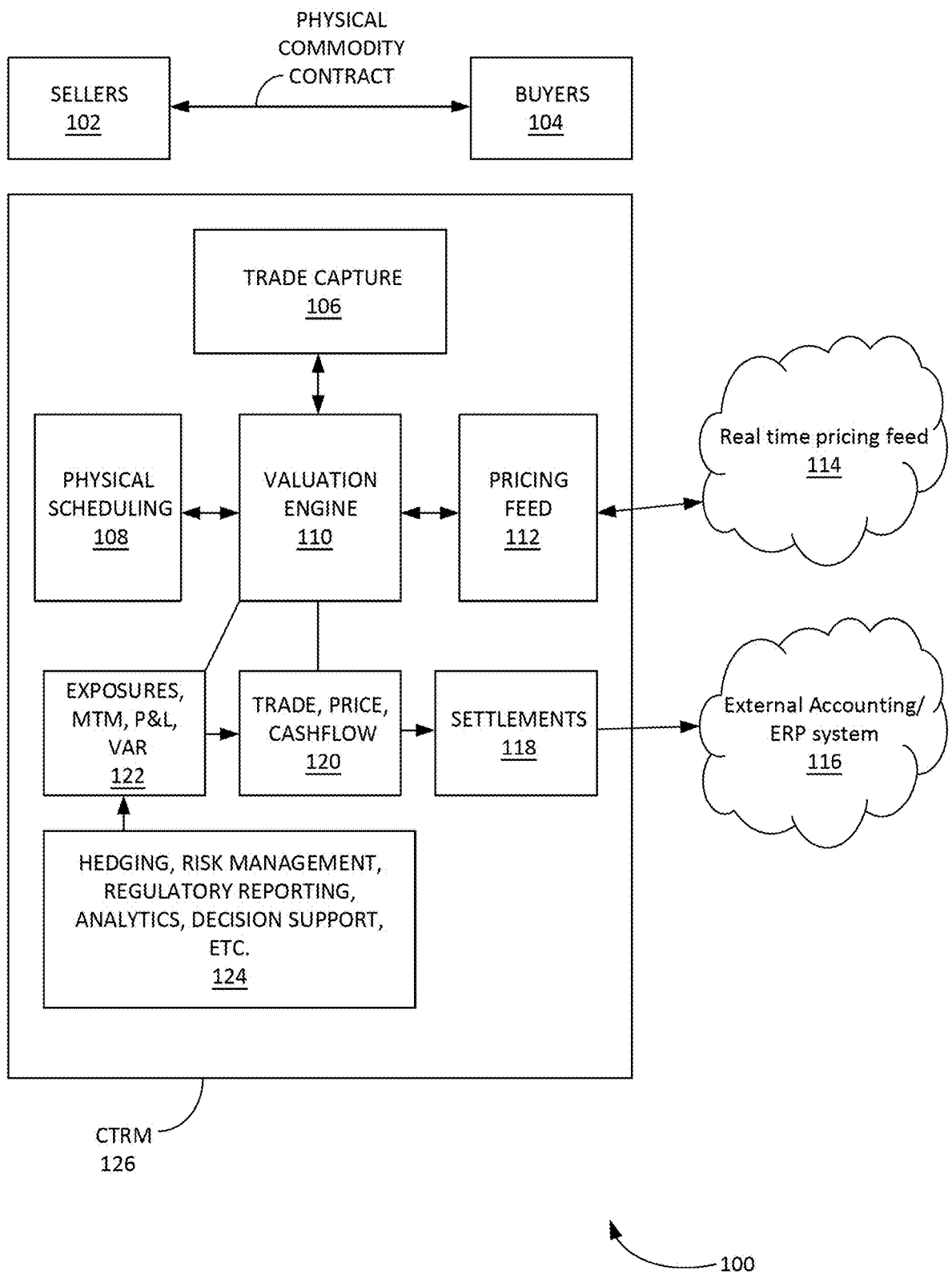
FIG. 1 illustrates an example system for implementing a commodity trading and risk management (CTRM), according to some embodiments.

The Figures described above are a representative set, and are not an exhaustive with respect to embodying the invention.

DESCRIPTION

Disclosed are a system, method, and article of manufacture for commodity trading and risk management. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, relationship structures, logic-based algorithms, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Commodity market is a market that trades in the primary economic sector. Commodity markets can include physical trading and derivatives trading using spot prices, forwards, futures, and options on futures.

Docker is a set of platform as a service (PaaS) products that use OS-level virtualization to deliver software in packages called containers. Containers are isolated from one another and bundle their own software, libraries, and configuration files; they can communicate with each other through well-defined channels. Because all of the containers share the services of a single operating system kernel, they use fewer resources than virtual machines.

Freight transport is the physical process of transporting commodities and merchandise goods and cargo.

Mark-to-market (MTM) or fair value accounting refers to accounting for the fair value of an asset or liability based on the current market price, or the price for similar assets and liabilities, or based on another objectively assessed fair value.

Ore is natural rock or sediment that typically contains metals, one or multiple metals such as Zinc, lead, Copper, Silver, Gold, Tin, Antimony etc., and/or other metallic or non-metallic impurities. Large pieces of the ore feed are broken through crushing and/or grinding to convert into fine powder, which is then processed though froth flotation, leaching, and levigation to remove unwanted non-metallic impurities and resulting into highly concentrated material. Based on physical properties of the compound of the metals available in the concentrated material, it will be identified as Zinc concentrates, Copper concentrates, Tin concentrates, etc. For example, a zinc concentrate contains about 55% of zinc with some copper, lead, and iron.

Physical metal concentrates can include more than one metal, in addition to various impurities. The main metals can be the payable components. The impurities may impact pricing/valuation of the metal concentrate.

Refined Metals are the end results in form of pure metals after processing Concentrated ores through calcination, roasting, smelting, and refining.

Refined metals are generally sold in form of ingots, bars, alloys, sheets, rods etc. One trade of refined metal will only include one particular metal as trading commodity.

Trading commodity can be, inter alia: Zinc, Al, Cu, Gold, Silver etc. In some examples, one physical trade may include only one refined metal. In some examples, one concentrate material can have 2 or 3 major metal components.

WSMD is a weighing, sampling, and moisture detection process. WSMD is used at multiple stage of trade life cycle of concentrate material for below purposes, including, inter alia: deriving of final measurements in case of multiple sampling; to determine wet tonnage; to determine moisture level; to determine the content of particular metal components or level of impurities; etc. In case of disputes between buyer and seller, third party (umpires) WSMD results are also considered based on different umpiring rules, the final content of metals or level of impurities are determined.

Exemplary CTRM Systems

FIG. 1 illustrates an example system 100 for implementing a commodity trading and risk management (CTRM), according to some embodiments. Sellers 102 and Buyers 104 can implement a physical commodity contract. CTRM 126 can include a valuation engine 110. Valuation engine 110 can use trading capture 106 from the 'front office' and physical scheduling 108 from a 'middle office/operations. Valuation engine 110 can use, inter alia, pricing type, pricing rule(s), pricing term(s), quotation period, UOM conversions, FX conversions, etc., as well. Valuation engine can provide a pricing feed 112 to Real time pricing feed 114 (e.g. Bloomberg, Reuters, etc.). Additionally, CTRM 126 can use, inter alia: hedging, risk management, regulatory reporting, analytics, decision support, etc. 124; eExposures, MTM, P&L, VAR, 122; trade, price(s), cashflows 120; settlements 118; etc.; can be used by external accounting/ERP system 116.

CTRM 126 can hold historical and current trades done by a trading organization. It is noted that market prices can affect the P&L of the portfolio. Accordingly, it is desirable to view the real-time (e.g. assuming process, networking and/or other latencies) P&L as per the real-time price feed. CTRM 126 can track exposures in order to manage risk and hedge. For physical commodity trades, and also for paper trades like futures and swaps, exposures may not change with change in market prices. For option trades however, the market prices can have an impact on the delta (e.g. exposure for options). Accordingly, CTRM 126 can enable traders to view exposures real-time, so they can effectively trade/hedges. The exposures computation can be performed as part of end-of-day process in CTRM 126.

It is noted that due to the volume and complexity of the calculations involved, it may be difficult to do real-time calculation of exposures. CTRM 126 can provide a method to do the exposure calculation for options in real-time as per the real-time market prices. CTRM 126 can enable a technique to automatically "refresh" the GUI of client with real-time information from server, without client requesting a "refresh". Due to real-time position management, traders can see real-time. CTRM 126 can provide exposure and P&L on a GUI. This allows traders to do real time risk management and hedging. CTRM 126 can provide the ability to view combined physical and paper trade exposures and thus real-time hedging.

CTRM 126 can provide real time price data into a specified database (DB) via an application programming interface (API). CTRM 126 can provide updates to trades/new trades data through a CTRM GUI and/or exchange through processing (e.g. FIX integration).

Valuation Engine 110 processes the latest trades data to calculate exposures/P&L. Valuation Engine 110 can utilize a routine obtains the latest exposures, and real time market price stored in the DB to recalculate the exposures for options. The latest exposure and latest P&L can be updated in the DB table. Valuation Engine 110 can provide a trigger on the DB table that sends the message to a queue via a DB service broker. A duplex channel web service technology framework like Windows Communication Foundation (WCF) can provide a service listens to the queue client and connects to the Client GUI Application, Client GUI Application (e.g. via a duplex channel). The WCF sends data to clients via callback mechanism.

CTRM 126 can provide an API for real time market data Straight Through Processing (STP)/trade capture. CTRM 126 can enable the generation of position and exposures. CTRM 126 can provide a service to recalculate the exposures real time. CTRM 126 can propagate the DB changes to WCF. A duplex channel of WCF can call back the client to send real time data. This can cause a color flashing on the GUI.

CTRM 126 can Real time visual cues to identify if the exposure/P&L has gone up or down Provides ability to quickly trade/hedge, which can be critical for paper traders/hedge funds Ability to have a combined view of Physical positions and paper positions, on a real time basis Ability to view combined P&L of the portfolio on a real time basis, including the Physical and Paper trades.

Disclosed are examples of physical commodity trading using CTRM 126. These can include, inter alia: front office/risk; middle office/operations; back office/settlement; freight management; accounting; treasury; risk analytics and decision support system; regulatory reporting and compliance; management dashboard/reporting; etc. Physical Commodity Trading include, inter alia: OTC vs. exchange traded; examples of physical commodities trade capture valuation (e.g. before physical scheduling); operations (e.g. physical commodity movements); valuation (e.g. after physical scheduling); risk management (e.g. hedging, mark to market P&L, exposures, etc.); settlements; analytics; etc.

CTRM 126 can capture physical commodity trade capture attributes. CTRM 126 can enable an agreement between Buyer and Seller. CTRM 126 can use commodity quality, quantity pricing, costs, delivery details, payment details, etc.

CTRM 126 can utilize physical commodity attributes, group, grade, brand, shape, variety, quality specifications, unit of measures (UOMs), conversions (e.g. mass to mass/mass to volume/volume to volume, etc.).

It is noted that CTRM 126 can determine a relationship between a physical commodity and trade pricing types. CTRM 126 can use fixed pricing. A trade price is fixed by the buyer and seller. CTRM 126 can enable a mark to market. CTRM 126 can calculate P&L based on a benchmark index traded on an exchange. CTRM 126 can determine an index pricing trade price based on a benchmark index traded on an exchange, plus some premium or discount. CTRM 126 can determine a formula pricing trade price. This can be based on a formula applied on one or more indexes. CTRM 126 can determine trigger pricing. This price can be fixed on a lot-by-lot bases each, instead of total quantity. The price fixing can be a fixed price, an index, and/or formula based. CTRM 126 can determine component pricing (e.g. physical metal concentrate trades). Here, each component in the commodity (e.g. including the impurities) may be priced separately. Each component price can be based on a fixed price, index, and/or formula based.

CTRM 126 can implement valuation operations. These can be based on, inter alia, risk rule, risk term, etc. A risk rule tells whether business days are to be used and/or calendar days are to be used. A holiday rule tells how a holiday is treated in pricing calculation. Possible options used by CTRM 126 can include, inter alia: skip, previous, next, include custom events, etc. A pricing period can be based on events in the lifecycle of commodity deal. An example can be trade end date, invoice date, bill of lading date, delivery date, etc. A risk term tells which prices are to be considered for pricing calculation. For example, a current month average, next month average, previous month average, and/or based on event dates. Another example can be five (5) days around a BL (e.g. bill of lading event). Pricing period pricing days can be calculated based on, inter alia: pricing rule, holiday rule and pricing term. Prices in the pricing period may considered for price computation.

A physical commodity valuation example is now provided (e.g. using a fixed price). In one example of a fixed price trade commodity can be as follows: Aluminum Trade: BUY 100 MT from Counterpart X @ 2100 USD/MT, FOB, Rotterdam Delivery March 2021, BL: 31 Mar. 2021 Payment Date: BL+30 Days MTM: LME Aluminum, 5 days around BL Trade Price: 2100 USD/MT (fixed) Market Price: 2185 USD/MT Average of prices for 29 March, 30 March, 31 March, 1 April, 2 April for LME Aluminum index Cashflow: 100 MT Qty @ 2100 USD/MT, Cashflow Amount=USD 210,000 Position: Physical Position of 100 MT, realizes as the scheduling is done Exposure: Physical Exposure of 100 MT on LME Aluminum, divided equally per day in the delivery period MTM P&L: (Market Price−Trade Price)*Qty=USD 8,500.

A physical commodity valuation example is now provided (e.g. using an index price). This example of an index priced trade commodity can be as follows: Aluminum Trade: BUY 100 MT from Counterpart X @ LME Aluminum 5 Days around BL, FOB, Rotterdam Delivery March 2021, BL: 31 Mar. 2021 Payment Date: BL+30 Days MTM: LME Aluminum, Current month average Trade Price: 2185 USD/MT Average of prices for 29 March, 30 March, 31 March, 1 April, 2 April for LME Aluminum index Market Price: 2199 USD/MT Average of prices for entire March 2021 for LME Aluminum index Cashflow: 100 MT Qty @ 2185

USD/MT, Cashflow Amount=USD 218,500 Position: Physical Position of 100 MT, realizes as the scheduling is done Exposure: Financial Exposure of 100 MT on LME Aluminum, divided equally per day over 5 days of pricing Physical Exposure of 100 MT on LME Aluminum, divided equally per day for March 2021 MTM P&L: (Market Price−Trade Price)*Qty=USD 1,400.

A physical commodity valuation example is now provided using exposures. This can be a measure of how much the commodity is exposed to shifts in the price of the underlying asset. This example can be as follows: Exposure=(shocked price*position)−(price*position))/shock. In this formula, exposure can be total exposure in a settlement unit of a measure price that is calculated using a total trade price in settlement. A UoM shocked price ca be calculated using a total trade price after adding the shock to calculated settlement price of index/curve. This can utilize an exposure shock that is 0.01 position as a trade quantity in the settlement. The UoM physical exposure can be measured against the indexes involved in market price calculation. The financial exposure can be measured against the indexes involved in trade price calculation.

A physical commodity valuation example is now provided using risk management. It is noted that a hedging exposure view can help a trader decide on a hedging strategy. This can be based on a specified exposure level; the trader can take an offset position in Futures/swaps value at risk (VaR). CTRM 126 can provide a VaR process to check the current risk of the portfolio mark to market (MTM). With respect to P&L, trades can be marked against index on the exchange. CTRM 126 can provide a real time price data feed. Traders can see the MTM P&L against the latest market prices P&L. A variance decision support system can be provided by CTRM 126. This can provide an explanation of variance between two end of day P&Ls into appropriate buckets. A trader can take trading decisions based on the analysis to increase P&L/minimize losses.

A physical commodity valuation example is now provided using settlements. It is noted that a cashflow can be generated as soon as a trade is captured and/or operations are created. CTRM 126 can provide visibility into payables/receivables to the accounting desk. CTRM 126 provide a sub-ledger ability to specify criteria for transactions to populate GL sub-ledger accounts. This can be integrated with an external ERP Accounting/Finance system. CTRM 126 can enable AR/AP Invoices. An accounting desk operative in CTRM 126 can capture the payables/receivables invoices. Accordingly, AP/AR invoices can be integrated with an external ERP Accounting/Finance system. Payments/Receipts Payments/Receipts can be captured against the AP/AR invoices Payments/Receipts. Thus, CTRM 126 can integrate transactions from an external ERP.

Example Processes

Figure 2:
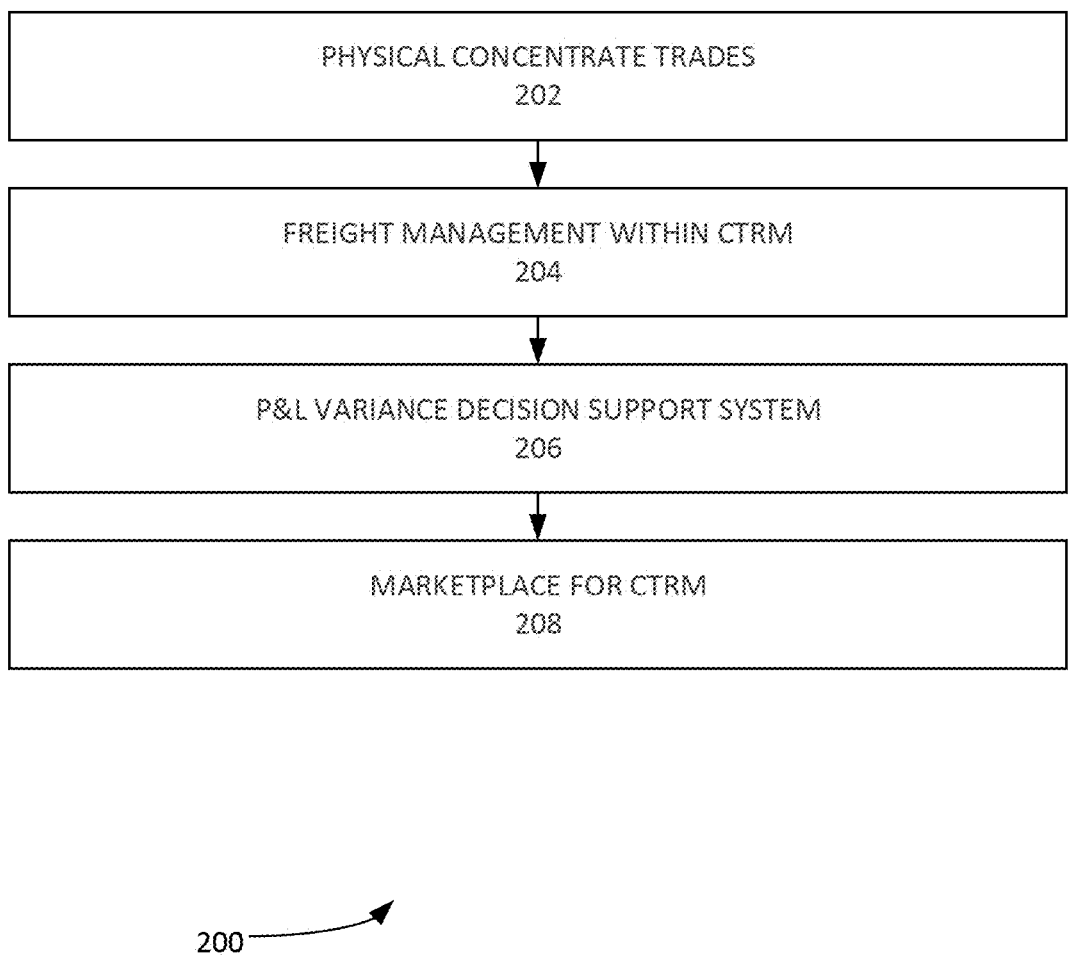
FIG. 2 illustrates an example process for implementing a commodity trading and risk management (CTRM), according to some embodiments.
Figure 3:
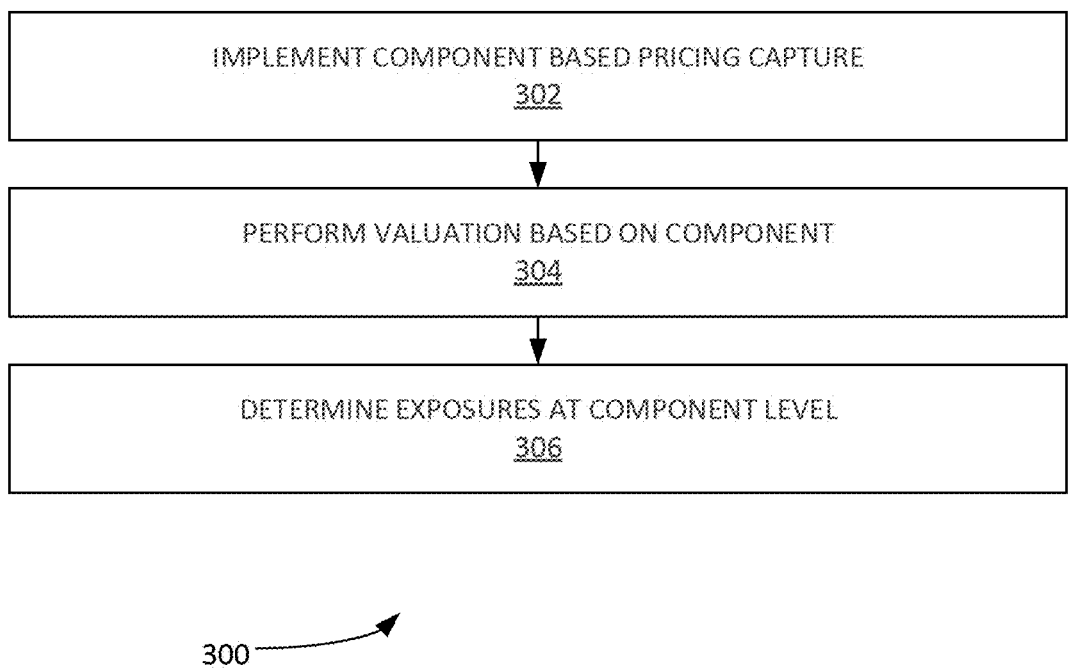
FIG. 3 illustrates an example process for implementing a physical concentrate trade, according to some embodiments.

FIG. 2 illustrates an example process 200 for implementing a commodity trading and risk management (CTRM), according to some embodiments. In step 202, process 200 can implement physical concentrate trades. FIG. 3 illustrates an example process 300 for implementing a physical concentrate trade, according to some embodiments. Process 300 can be used to implement step 202 (as well as Appendix A of U.S. Provisional Patent Application No. 63/186,180 and/or system 700). In step 302, process 300 can implement component-based pricing capture. In step 304, process 300 can perform valuation based on component. In step 306, process 300 can determine exposures at component level.

In one example, process 300 can be used for physical metal concentrates valuation. Appendix A of U.S. Provisional Patent Application No. 63/186,180 illustrates an example set of processes and screen shots for implement physical metal concentrates trades. These are provided by way of example and not of limitation. It is noted that the pricing of metal concentrate differs from refined metals. For refined metals, only one main metal is a payable component. The pricing can be straightforward. Risk management can be implemented for one metal, which is usually traded on the exchanges. Hedging is possible as the main refined metal is traded on exchange.

In case of metal concentrates, more than one "payable" component can be present. The pricing for each payable component can differ. Accordingly, complex pricing requirements can be implemented for each of the components. Pricing involves computation of "payable" content, which drives the pricing. Metal concentrates may not be directly traded on the exchange, hence risk management is difficult to determine, unless the component level exposures are available. For hedging, process 200 can analyze/calculate component level exposures.

Figure 4:
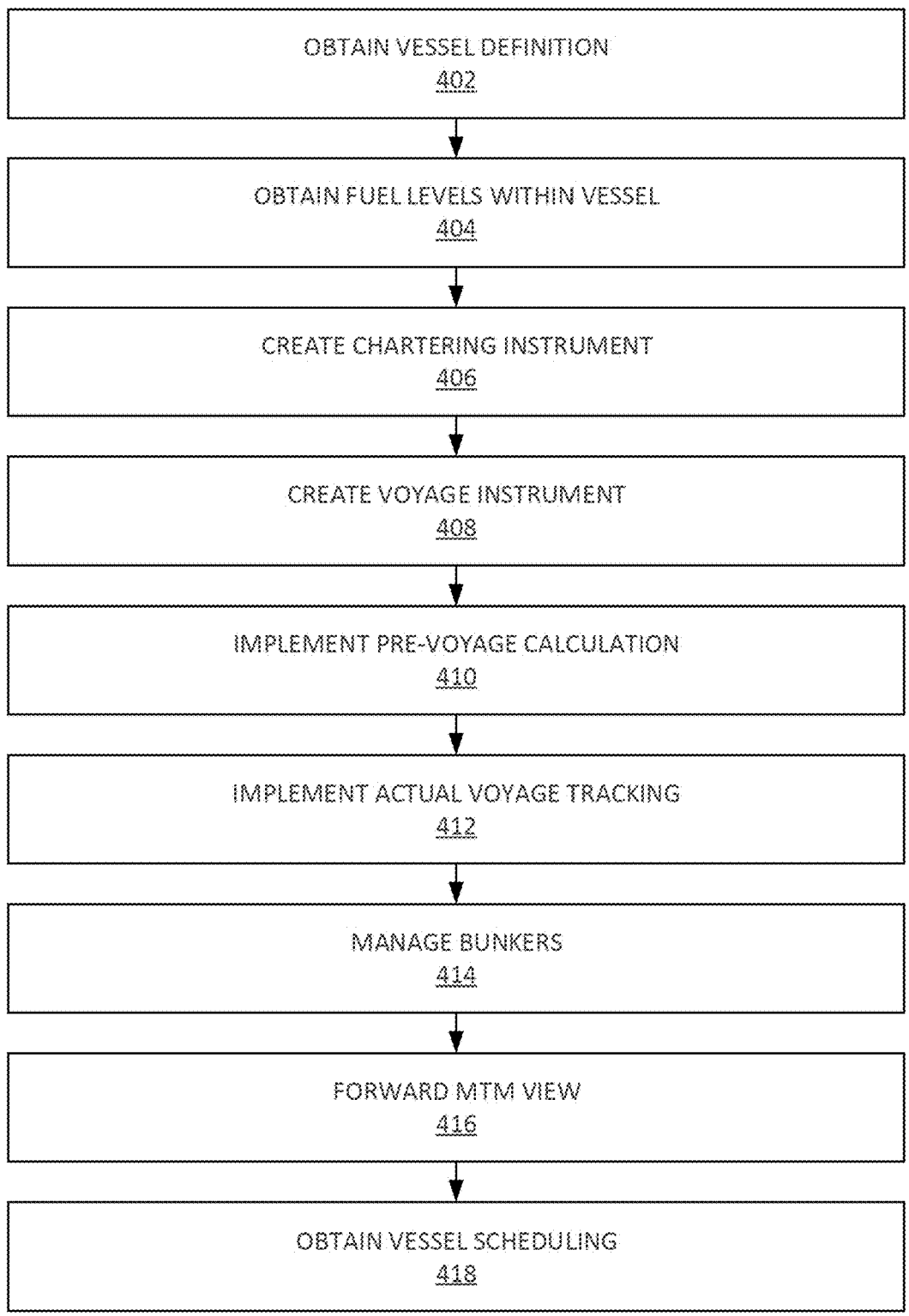
FIG. 4 illustrates an example process for implementing freight management with CTRM, according to some embodiments.

Returning to process 200, in step 204, process 200 can implement freight management within CTRM. FIG. 4 illustrates an example process 400 for implementing freight management with CTRM, according to some embodiments. Process 400 (as well as Appendix B of U.S. Provisional Patent Application No. 63/186,180 and/or system 800) can be used to implement step 204. In step 402, process 400 can obtain a vessel definition. In step 404, process 400 can determine fuel levels within vessel. In step 406, process 400 can create chartering instrument. In step 408, process 400 can create voyage instrument. In step 410, process 400 can implement pre-voyage calculation. In step 412, process 400 can implement actual voyage tracking. In step 414, process 400 can manage bunkers. In step 416, process 400 can forward a market-to-market (MTM) view. In step 418, process 400 can obtain vessel scheduling.

Appendix B of U.S. Provisional Patent Application No. 63/186,180 provides additional information for implementing freight management with CTRM. Process 400 can utilize these example methods in whole and/or in part.

Figure 5:
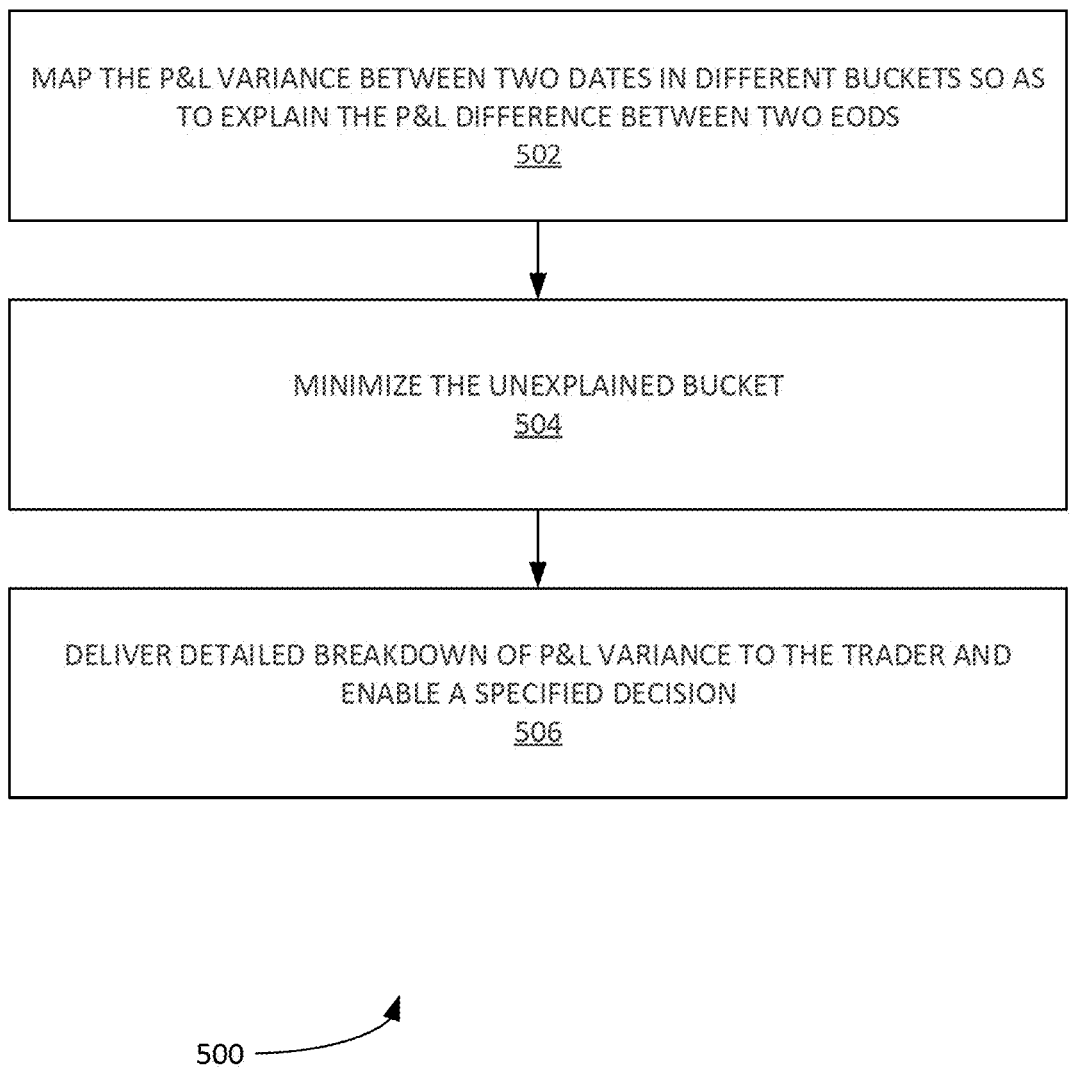
FIG. 5 illustrates an example process for implementing P&L variation decision support, according to some embodiments.

In step 206, process 200 can implement a profit and loss (P&L) variation decision support system. FIG. 5 illustrates an example process 500 for implementing P&L variation decision support, according to some embodiments. In step 502, process 500 can map the profit and loss (P&L) variance between two dates in different buckets so as to explain the P&L difference between two EODs. In step 504, process 500 can minimize the unexplained bucket. In step 506, process 500 can deliver detailed breakdown of P&L variance to the trader and enable a specified decision. Appendix C of U.S. Provisional Patent Application No. 63/186,180 includes additional information that can be used to implement process 500 and system 900 infra.

Figure 6:
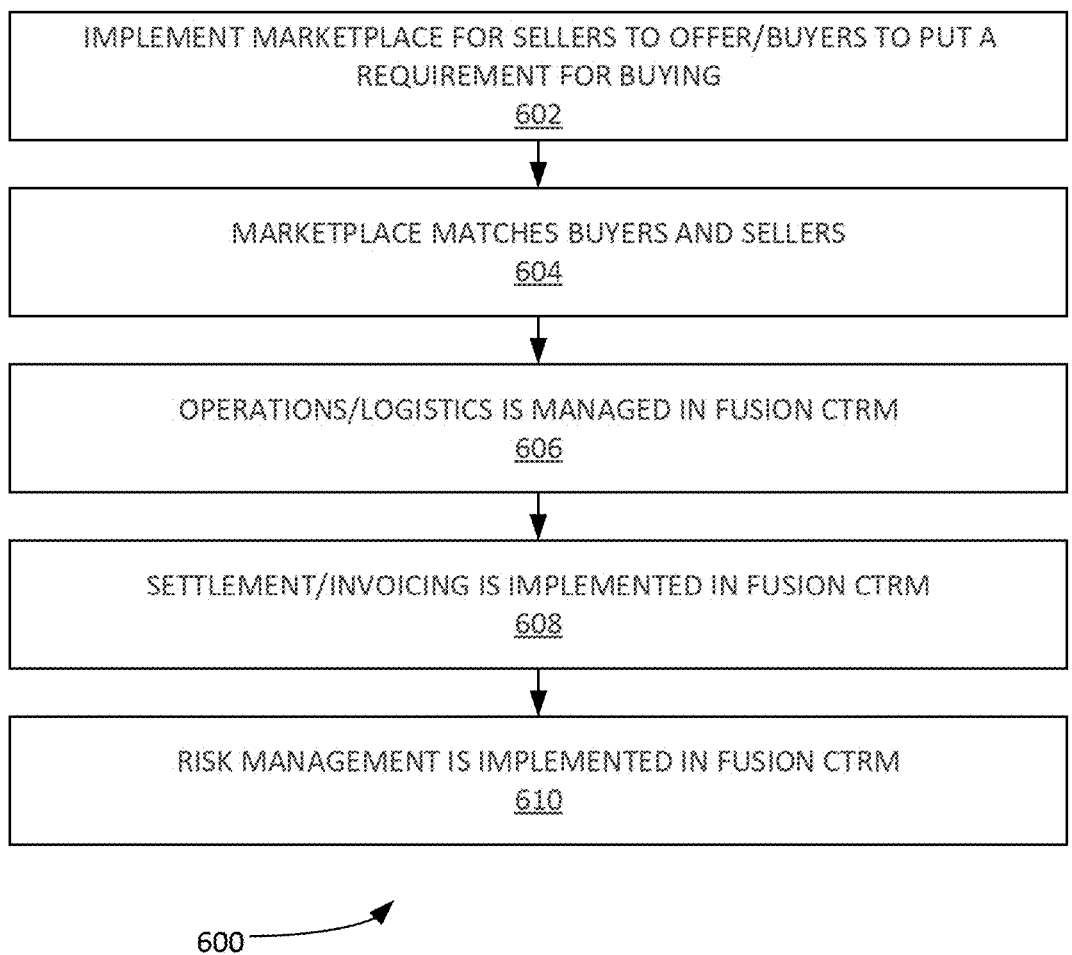
FIG. 6 illustrates an example process for implementing a marketplace for physical commodities with risk management, according to some embodiments.

Returning to process 200, in step 206, process 200 can implement a marketplace for physical commodities with risk management. FIG. 6 illustrates an example process 600 for implementing a marketplace for physical commodities with risk management, according to some embodiments. In step 602, process 600 can implement marketplace for sellers to offer/buyers to put a requirement for buying. In step 604, process 600 can provide and manage a marketplace matches buyers and sellers. In step 606, process 600 can enable operations/logistics to be managed in a fusion CTRM. In step 608, process 600 can implement settlement/invoicing in the fusion CTRM. In step 610, process 600 can implement risk management in the fusion CTRM as well.

Additional Systems

Figure 7:
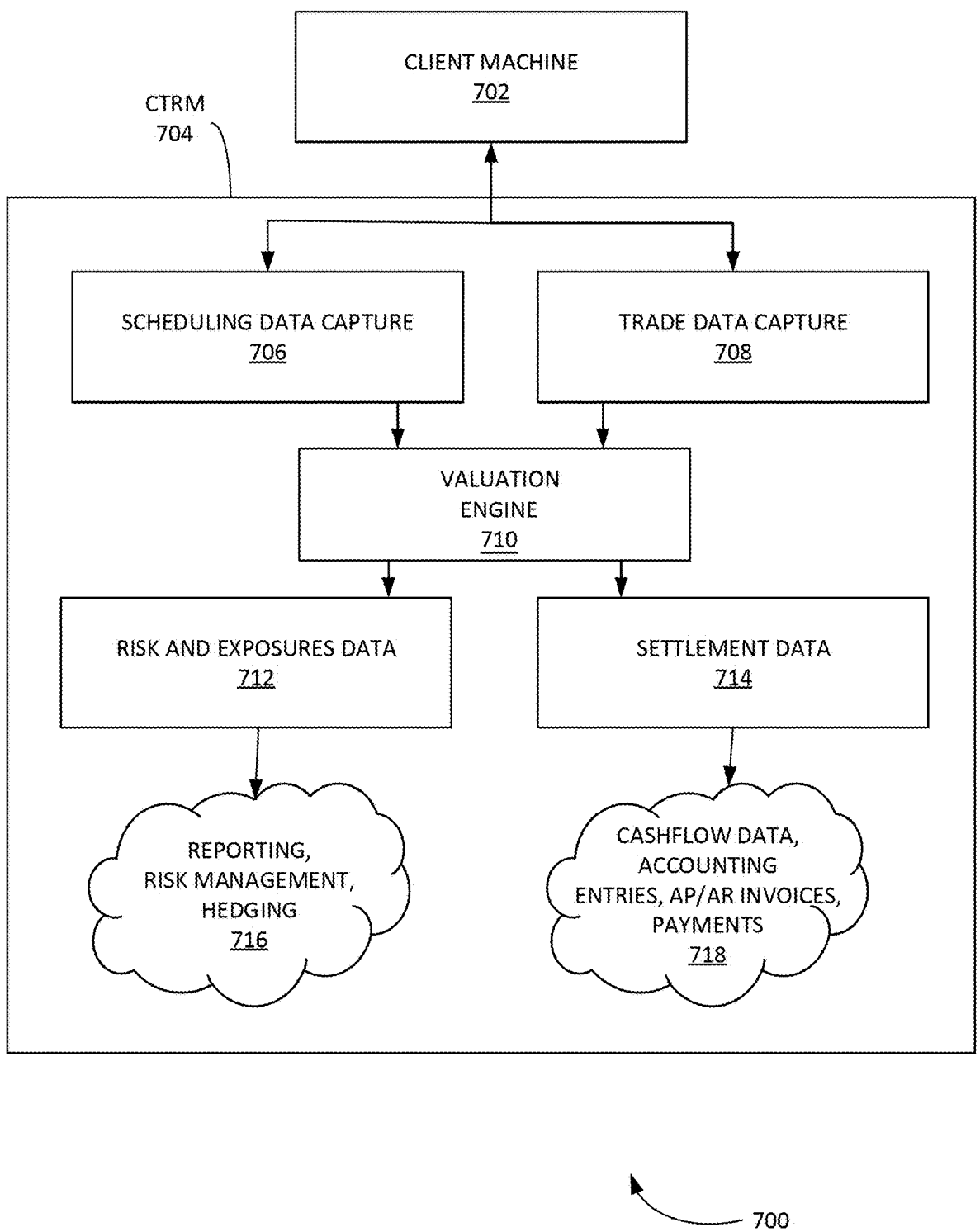
FIG. 7 illustrates an example CTRM enterprise application system, according to some embodiments.

FIG. 7 illustrates an example CTRM enterprise application system 700, according to some embodiments. System 700 can be used to implement process 300. System 700 can be used to implement the methods provided in Appendix A of U.S. Provisional Patent Application No. 63/186,180.

Figure 8:
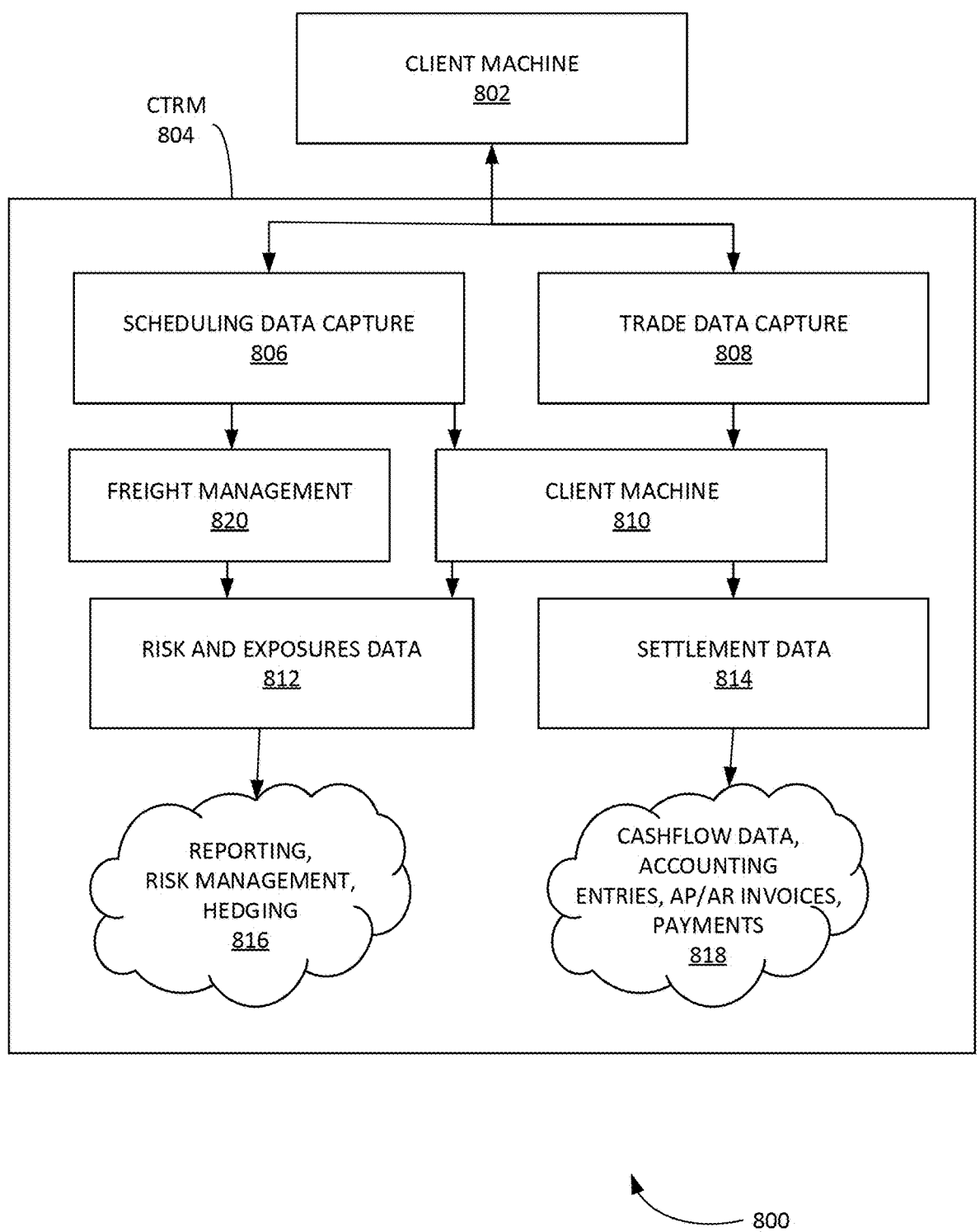
FIG. 8 illustrates an example commodity CTRM and freight management enterprise application system, according to some embodiments.

FIG. 8 illustrates an example commodity CTRM and freight management enterprise application system 800, according to some embodiments. System 800 can enable a combined view of Commodity P&L, Freight P&L (e.g. freight cost, bunker cost, other costs involved in shipping), exposures, etc. CTRM system 800 can be used by ship owners, as well as charterers (non-owners), who are commodity trader. CTRM system 800 can enable effective risk management of freight based on current and projected market conditions. CTRM system 800 enable effective trading decisions based on, inter alia: vessel availability, bunkers forward MTM view(s), etc.

It is noted that there can be three (3) main types of freight trading: fixing a ship as a charterer from a trading company; an owner employing their ship; Paper FFA's (Freight forward agreements).

Chartering a vessel is now discussed. The process of fixing a ship on the spot market are as follows. A physical trader can request a price for a certain cargo size, from a specific location. A charterer then talks to a broker who can in turn speak to an owner to obtain the best ship at the best price. Once agreed, it can be put on subjects. The operator can then clear the ship at the load port and discharge port once approved subjects are lifted.

Trading a ship as an owner is now discussed. An owner can have a number of ships which he/she must keep employed/on charter at all times to optimize returns. When an owner is fixing a ship, the owner can consider where the ship is coming from, where it is going to, and also making sure there is enough bunkers on board, etc. When owners are fixing their ships, they calculate the economics by earnings per day. This can be known as TCE (Time Charter Equivalent).

Other Types of Fixing and Owning. COA: A contract of affreightment is a contract between a ship-owner and the charterer, in which the ship-owner agrees to carry the cargo for the charterer in any ship for a specified time and amount. The charterer agrees to pay a specified price for the duration of this charter. A time charter is when a company charters a ship for a fixed amount of time from an owner. The price will be a fixed amount per day for a specified amount of time. The charterer will act as the owner of the vessel but will not be responsible for crewing the ship. Bareboat charter is the same as a time charter, but the company is responsible for crewing the ship and costs involved.

FFA (Freight Forward Agreements) are now discussed. FFAs can be transacted on a cleared basis and can be based on the terms and conditions of the FFABA standard contracts as adapted by the various clearing houses. Freight derivatives can provide a means of hedging exposure to freight market risk through the trading of specified time charter and voyage rates for forward positions. A settlement can be effected against a relevant route assessment (e.g. one published by the Baltic Exchange, etc.).

Figure 9:
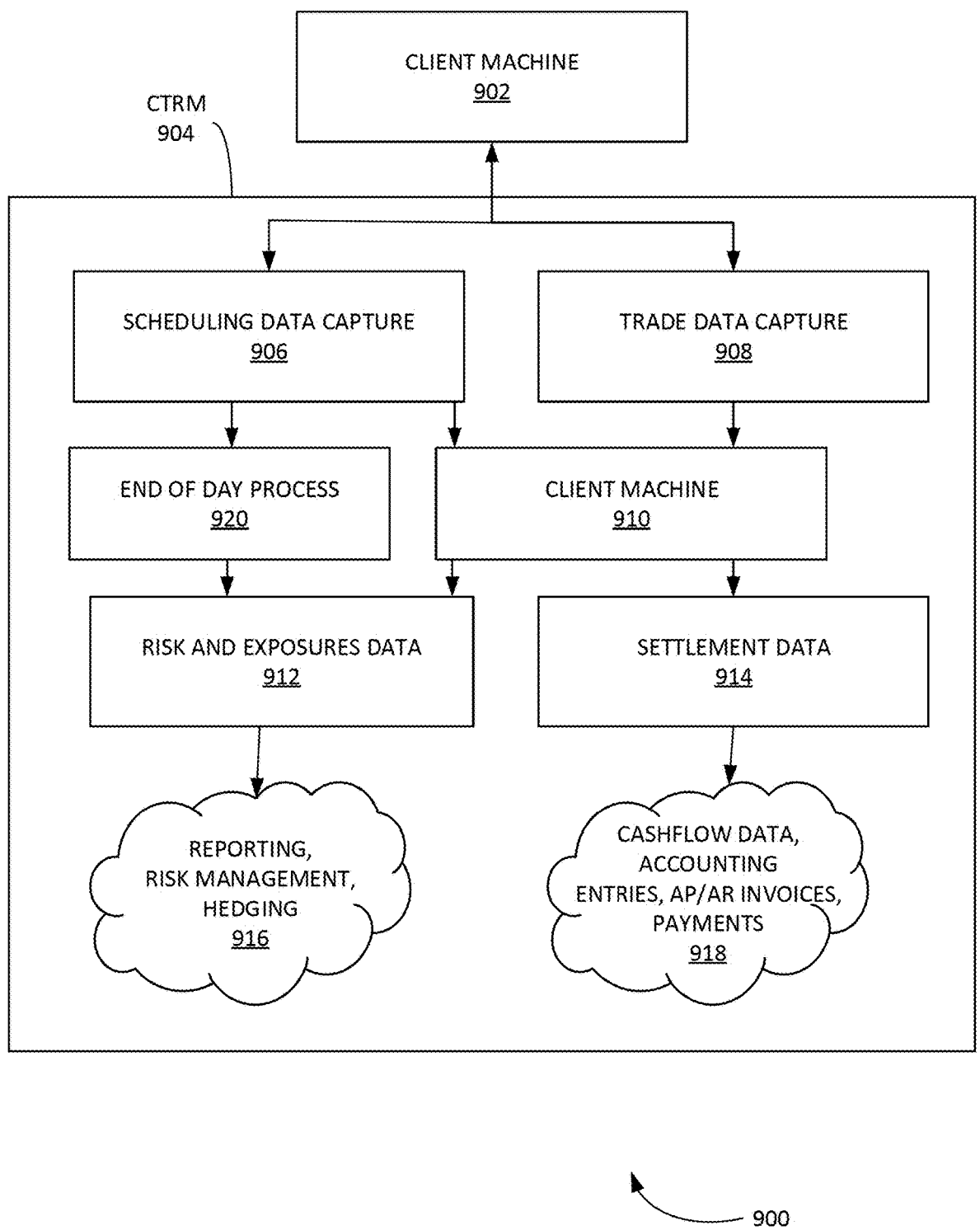
FIG. 9 illustrates an example commodity CTRM enterprise application system, according to some embodiments.

FIG. 9 illustrates an example commodity CTRM enterprise application system 900, according to some embodiments. It is noted that, for a trading organization, P&L is a measure of how well the trading operation is performing. Every day, due to various market factors, the P&L of the trading portfolio changes. From trader's perspective, it is important to understand why and how the P&L has moved between yesterday and today (e.g. analyzing the delta P&L). There are a number of activities that are happening every moment that can have an impact on P&L. Examples of this include, inter alia: market price movement, modification to trade pricing, quantity changes, FX rate changes, interest rate changes, scheduling/deliveries of the trade etc. As a trading organization, it is important to understand the impact each of the activities have on P&L, so that trading/risk management decisions can be taken based on it.

CTRM 900 can perform exhaustive P&L Variance Analytics. CTRM 900 can implement P&L Variance Analytics to provide the business user with information about delta P&L. CTRM 900 can implement P&L Variance analytics to split out the delta P&L value to determine the underlying reasons (e.g. fixation, quantity change, etc.). When comparing these measures, the user can be able to determine the risk of the trade and whether there are measurements that need to be taken (e.g. hedging the quantity risk). The output of P&L variance analytics can have a list of activities (e.g. buckets), and the attribution of delta P&L into each of those buckets. The P&L Variance analytics can provide the P&L attributions and transaction details contributing to the change in its respective category. This can enable traders/business users to investigate any abnormality or understand where the risk is. For physical concentrates, the P&L calculation can be at the component granularity, including the corresponding charges/costs. For example, for a lead concentrate trade, the P&L calculation can be at the "Lead" and "Silver" components granularity with its treatment and refining charges.

CTRM system 900 can perform an end of day is a process that to take snapshot of the existing transactions in the system as of a particular day. As market prices are changing every day, the latest prices from the (e.g. previous) day are entered in CTRM system 900 as a first step. After the prices are in, the trades and other transactions CTRM system 900 can be revalued based on the latest market prices. Once the transactions are revalued, the transactions are stored in a separate set of tables. These tables act as EoD snapshot, and can be referred to any time in order to find out the positions/P&L as of a particular day.

CTRM system 900 can identify a number of buckets in which the delta P&L is attributed to. Once the buckets are identified, CTRM system 900 can identify the transaction actions to qualify each bucket. On each of the action performed by the user in CTRM system 900, note down the action in "state" table against the transaction unique ID. The "state" table contains all the user actions performed on the transaction. The actions that can affect the P&L are recorded in "state" table. When user runs end-of-day (EOD) process, store the complete "as-is version" of the object in data warehouse. This object is the binary object, which can be directly used by the valuation engine for computation. CTRM system 900 looks up the "state" table for the transaction unique ID. This provides actions performed by user on the transaction Actions in the "State" table impact the P&L of a transaction.

There are some actions which are driven by external factors (e.g. market prices, FX Rates, etc.) which impact the P&L. CTRM system 900 can collect information of each of the actions found in "state" table that may impact P&L, along with each of the external factors that may impact P&L. When the EoD is run for a day D, CTRM system 900 picks up the object stored in data warehouse for "D-1" version. CTRM system 900 can then perform each action on the "D-1" version of the transaction, and notes down the P&L. For each action applied on "D-1" version, the system notes down the P&L and difference between P&L of D and D-1.

This data is stored in the database against the action. These steps are repeated for each of the actions. Like this, all transactions are processed. Since all transactions are mutually exclusive to each other, in order to improve the performance, multi-threading is used.

Figure 10:
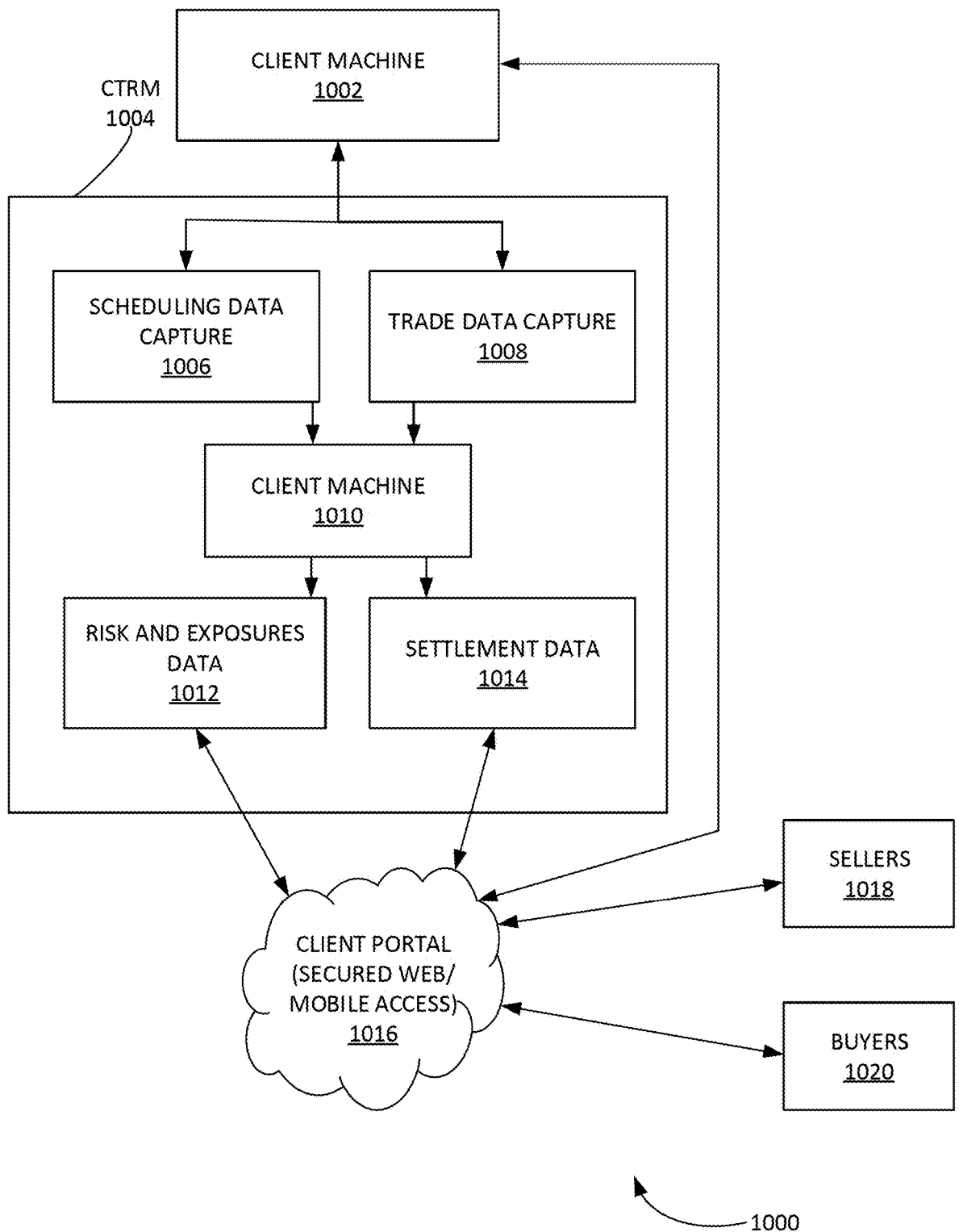
FIG. 10 illustrates an example system for implementing a CTRM enterprise application system with Client Portal, according to some embodiments.

FIG. 10 illustrates an example system 1000 for implementing a CTRM enterprise application system with Client Portal, according to some embodiments. Appendix D of U.S. Provisional Patent Application No. 63/186,180 includes additional information for implementing system 1000. A client portal can be a web/mobile based tool on top of CTRM system 1000, for the benefit of the commodity trading organization which is using CTRM system 1000 to manage its trading business. A secured web/mobile based portal is implemented where buyers and sellers for a commodity trading organization can trade with the trading organization. The supply chain/operations can be managed in the CTRM system. Risk management can be implemented in CTRM system 1000 as well. The data (e.g. specific to a counterparty) related to contract, invoices, payments can be made visible to the counterparty on client portal. An objective of the client portal is to provide improved transparency and speed up the whole lifecycle of the trade.

The client portal can sit directly on top of CTRM system 1000. A trading organization can use CTRM system 1000, through which the administrators can create logins for their counterparties for the web/mobile-based client portal. The seller counterparties of the trading organization can input their sell offers on the client portal. This can create automatic "pending" deal(s) in CTRM system 1000. The trading organization can choose to accept the deal as-is, and/or negotiate on the client portal. Once the deal is finalized, the operational logistics can be taken care in the CTRM system 1000. Similarly, the trading organization can input their requirements and sellers can view those requirements; and can choose to give offers on them. This creates automatic pending deal in CTRM system 1000. The trading organization can choose to accept the deal as-is, or negotiate on the client portal.

The trading organization can input the stock that they wish to sell on the portal as well. Buyers can choose to buy the stock available for sale. This creates an automatic "pending" deal in CTRM system 1000. The trading organization can choose to accept the deal as-is, and/or negotiate on the client portal. Once the deal is finalized, the operational logistics are taken care in the CTRM system 1000. Similarly, buyer counterparties of the trading organization can put their requirements on the portal. The trading organization can choose to accept the requirements, which creates automatic "pending" deal in CTRM system 1000. The deal can be negotiated on the client portal and accepted/rejected based on it. Once the deal is finalized, the operational logistics are taken care in CTRM system 1000.

Figure 11:
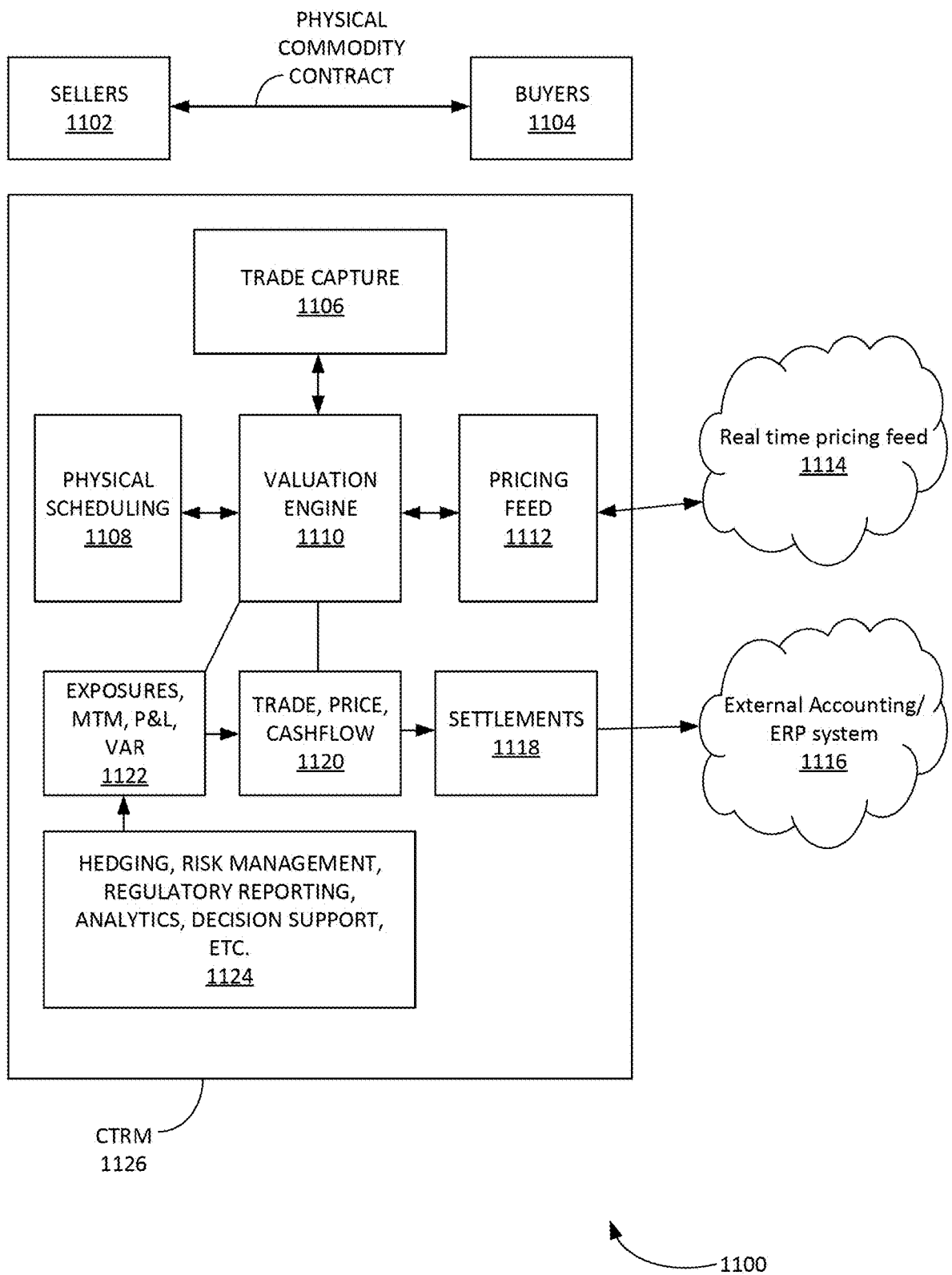
FIG. 11 illustrates an example system for implementing a CTRM enterprise application system, according to some embodiments.

FIG. 11 illustrates an example system 1100 for implementing a CTRM enterprise application system, according to some embodiments. Appendix E of U.S. Provisional Patent Application No. 63/186,180 of includes additional information for implementing system 1100 in some embodiments.

Figure 12:
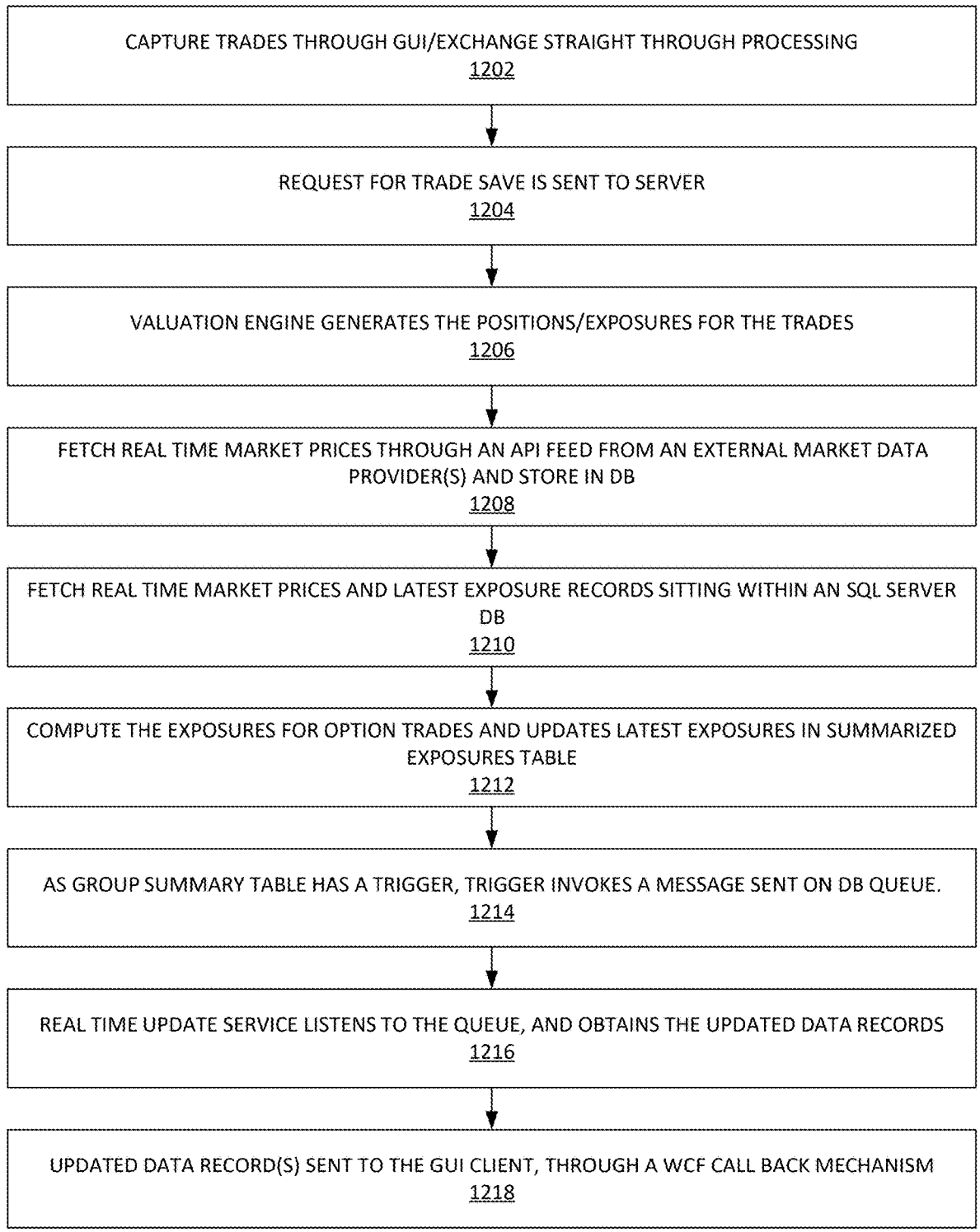
FIG. 12 illustrates an example process for technical overview of real time position management, according to some embodiments.

FIG. 12 illustrates an example process 1200 for technical overview of real time position management, according to some embodiments. Process 1200 can be implemented by system 1100. In step 1202, the trades are captured through GUI/Exchange Straight through processing (e.g. FIX STP integration). In step 1204, a request for trade save is sent to server. The valuation engine can then be invoked. In steps 1206, the valuation engine generates the positions/exposures for the trades. In step 1208, real time market prices are fetched through an API feed from an external market data provider(s) and stored in a database. In step 1210, the real time market prices and latest exposure records are fetched using process 1200 sitting within an SQL Server DB. In step 1212, process 1100 computes the exposures for option trades and updates the latest exposures in the summarized exposures table (e.g. a GROUP SUMMARY table). In step 1214, the GROUP SUMMARY table has a trigger written on it. The trigger invokes a message sent on the DB queue. In step 1216, a real time update service listens to the queue, and obtains the updated data records. In step 1218, an updated data record(s) can be sent to the GUI client, through a WCF call back mechanism.

Additional Systems

Figure 13:
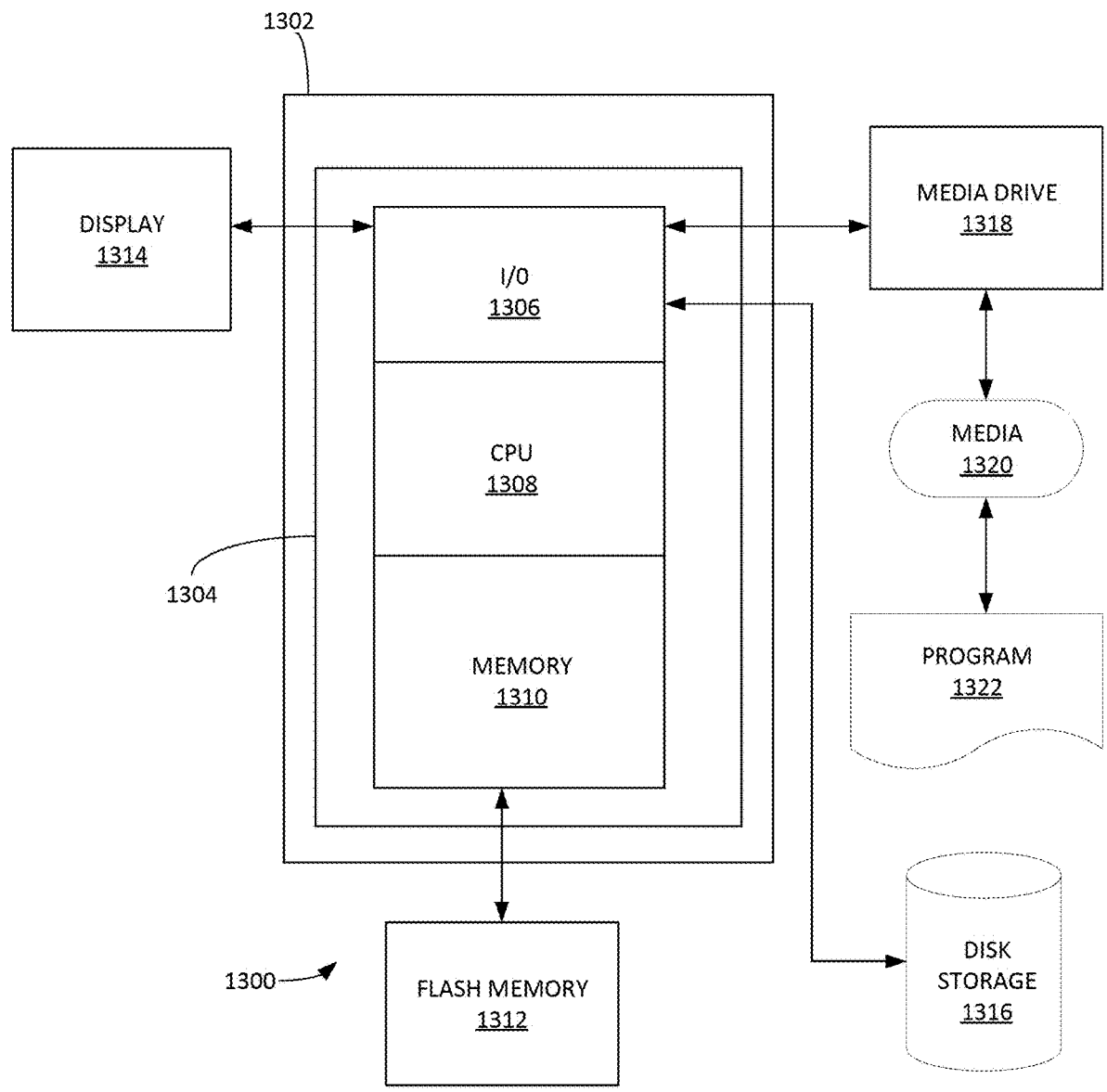
FIG. 13 depicts an exemplary computing system that can be configured to perform any one of the processes provided herein.

FIG. 13 depicts an exemplary computing system 1300 that can be configured to perform any one of the processes provided herein. In this context, computing system1 700 may include, for example, a processor, memory, storage, and I/O devices (e.g., monitor, keyboard, disk drive, Internet connection, etc.). However, computing system 1300 may include circuitry or other specialized hardware for carrying out some or all aspects of the processes. In some operational settings, computing system 1300 may be configured as a system that includes one or more units, each of which is configured to carry out some aspects of the processes either in software, hardware, or some combination thereof.

FIG. 13 depicts computing system 1300 with a number of components that may be used to perform any of the processes described herein. The main system 1302 includes a motherboard 1304 having an I/O section 1306, one or more central processing units (CPU) 1308, and a memory section 1310, which may have a flash memory card 1312 related to it. The I/O section 1306 can be connected to a display 1314, a keyboard and/or other user input (not shown), a disk storage unit 1316, and a media drive unit 1318. The media drive unit 1318 can read/write a computer-readable medium 1320, which can contain programs 1322 and/or data. Computing system 1300 can include a web browser. Moreover, it is noted that computing system 1300 can be configured to include additional systems in order to fulfill various functionalities. Computing system 1300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Systems and Methods of a CTRM System for Metals Trading

Figure 14:
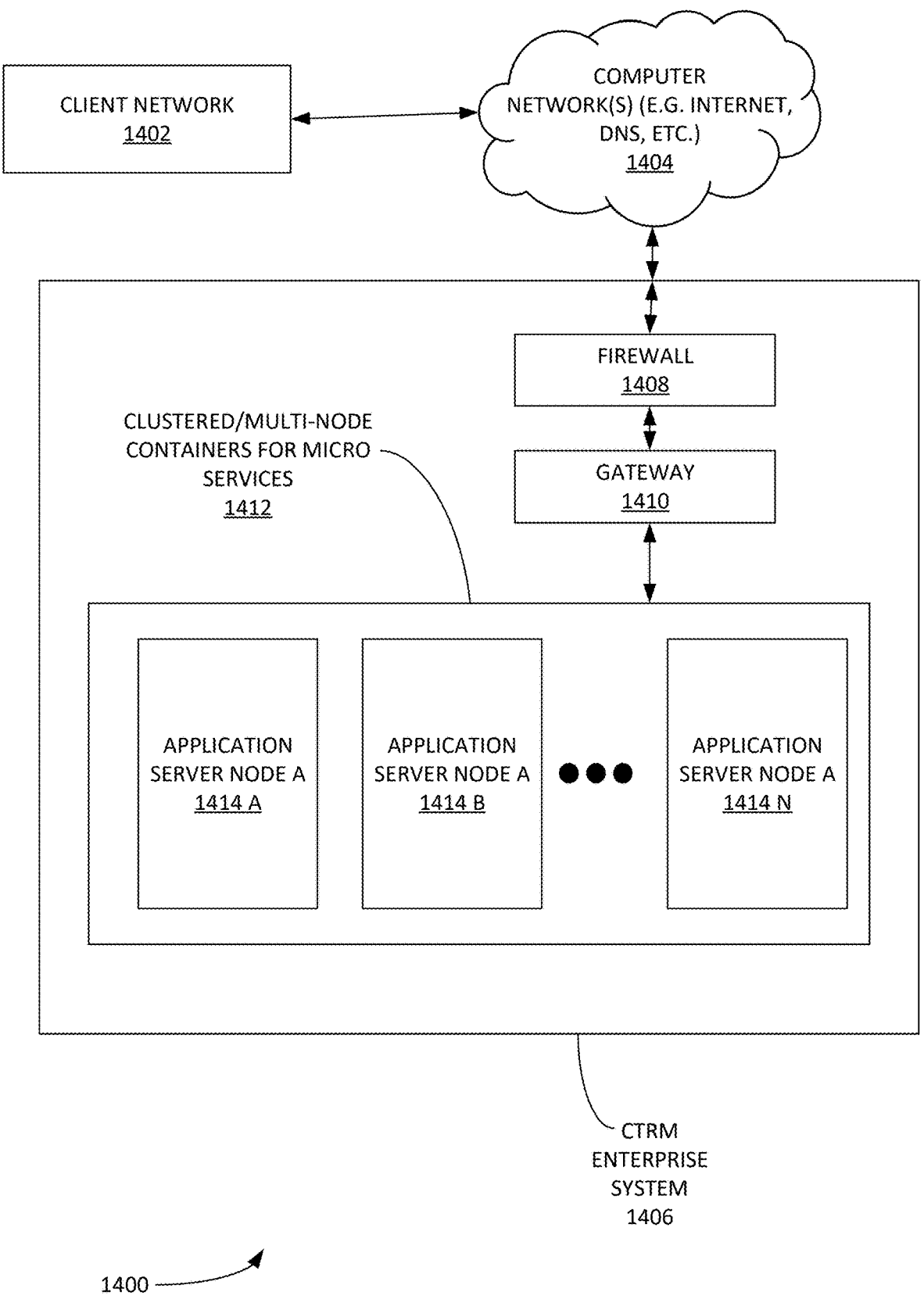
FIG. 14 illustrates an example system metals trading, according to some embodiments.

FIG. 14 illustrates an example system 1400 metals trading, according to some embodiments. System 1400 includes CTRM enterprise system 1402. CTRM enterprise system 1402 can include a firewall 1408 and gateway 1410. Firewall 1408 can be a network security system that monitors and controls incoming and outgoing network traffic based on predetermined security rules. Gateway 1410 can be a network node equipped for interfacing with another network that uses different communication protocols.

CTRM enterprise system 1402 can provide CTRM solutions that support the specific trade capture and pricing requirements for metals commodities. CTRM enterprise system 1402 can use application server nodes 1414 A-N to perform various tasks. Metal commodities can be divided into and include: base metals (e.g. ores and concentrates) and/or Refined Metals (e.g. ferrous metals, non-ferrous metals, scrap metals, precious metals, finished metal products, etc.). These metal commodities may require support of a variety of pricing types that includes, inter alia: fixed pricing, index pricing, trigger pricing, formula pricing, and componentized trigger pricing. Application server nodes 1414 A-N can manage complex quality-based contract pricing as also required to be supported in the solution. It is noted that quality specification examples are, inter alia: moisture FE (Ferrous) content, Silica content, impurities content, etc. Application server nodes 1414 A-N can calculate and manage complex formula-based contract penalties.

Figure 15:
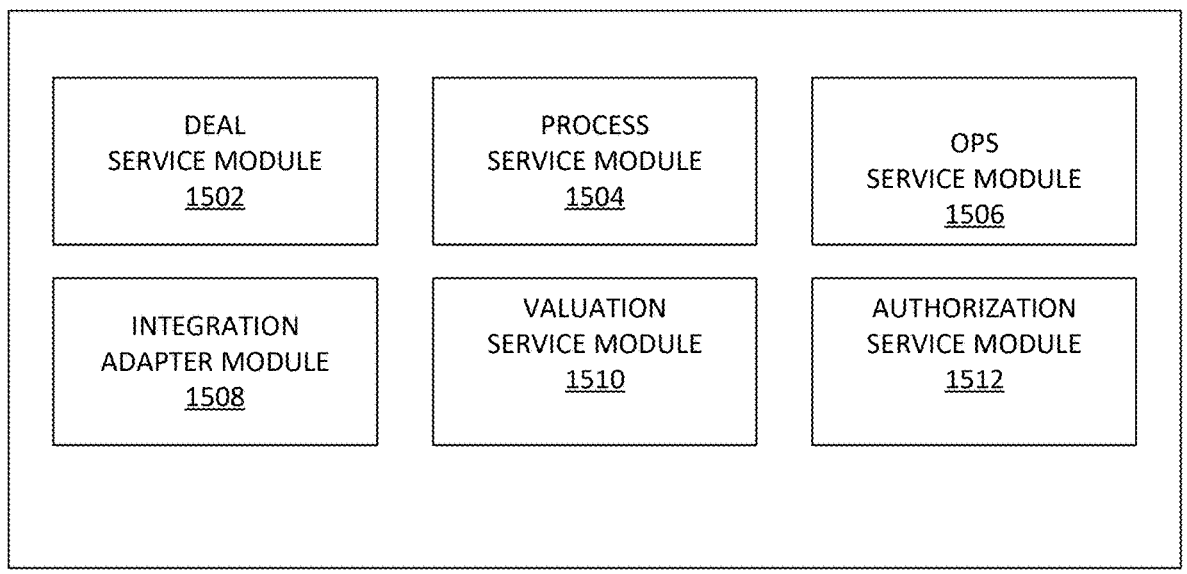
FIG. 15 illustrates an example application server node, according to some embodiments.

FIG. 15 illustrates an example application server node 1500, according to some embodiments. Application server node 1500 can be used as a template for application nodes 1414 A-N. Application server node 1500 can include various microservice modules, such as, inter alia: deal service module 1502, process service module 1504, operation service module 1506, integration adapter 1508, valuation service module 1510, authorization service module 1512, etc. Application node 1500 can be written using a micro services architecture pattern. Application business logic can be divided into logical units (e.g. micro services). Each micro service contains an entire business logic and a related data model. Micro services can communicate to each other, in order to perform cross service business logic. Each micro service can be independent of other micro services. Examples of micro services can be a deal service (e.g. to manage commodity deals data operations), process service (e.g. to carry out background processes like end of day processes, etc.), OPS service (e.g. to manage physical operations related data), etc. These can be implemented by the respective microservice modules 1502-1512 provided supra. Each micro service can be built in the form of an image. The image can be a self-contained environment to run the micro service. The images can be containerized using existing technologies (e.g. Docker™, etc.). Containers for all micro service images can be put together in a unit, called as pod (e.g. a Kubernetes pod). One application server node 1500 (e.g. a virtual machine with Linux or Windows OS) can host multiple pods. For high availability, multiple server nodes can be configured using a load balancer.

Figure 16:
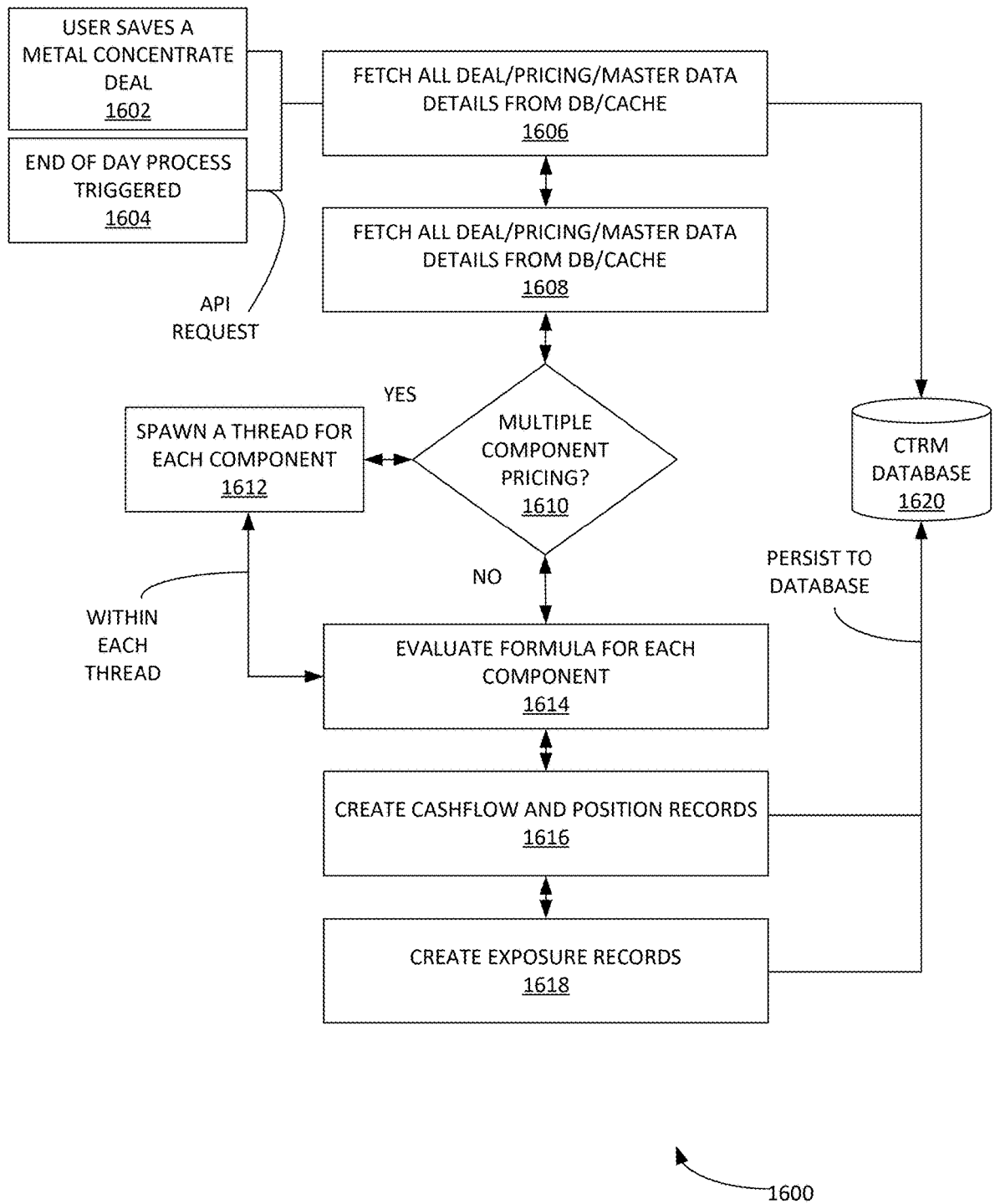
FIG. 16 illustrates an example process for multi-threaded valuation engine for valuing concentrates deals, according to some embodiments.

FIG. 16 illustrates an example process 1600 for multi-threaded valuation engine for valuing concentrates deals, according to some embodiments. In step 1602, a user saves a metal concentrate deal. In step 1604, the end of day process is triggered. In step 1606, process 1600 can fetch all deal/pricing/master data details from database (DB)/cache. In step 1608, process 1600 can fetch all deal/pricing/master data details from DB/cache. In step 1610, process 1600 can determine if there is multiple component pricing. If 'yes', then process 1600 can proceed to step 1612 and performs step 1614 within each thread. In 'no', then process 1600 can proceed to step 1614. In step 1612, process 1600 spawns an API request for a thread for each component. In step 1614, process evaluates a formula for each component. In step 1616, process 1600 creates a cashflow and position record(s).

In step 1618, process 1600 creates exposure records. In step 1620, process 1600 can persist the outputs of steps 1606, 1616 and 1618 to a database and store CTRM database.

Figure 17:
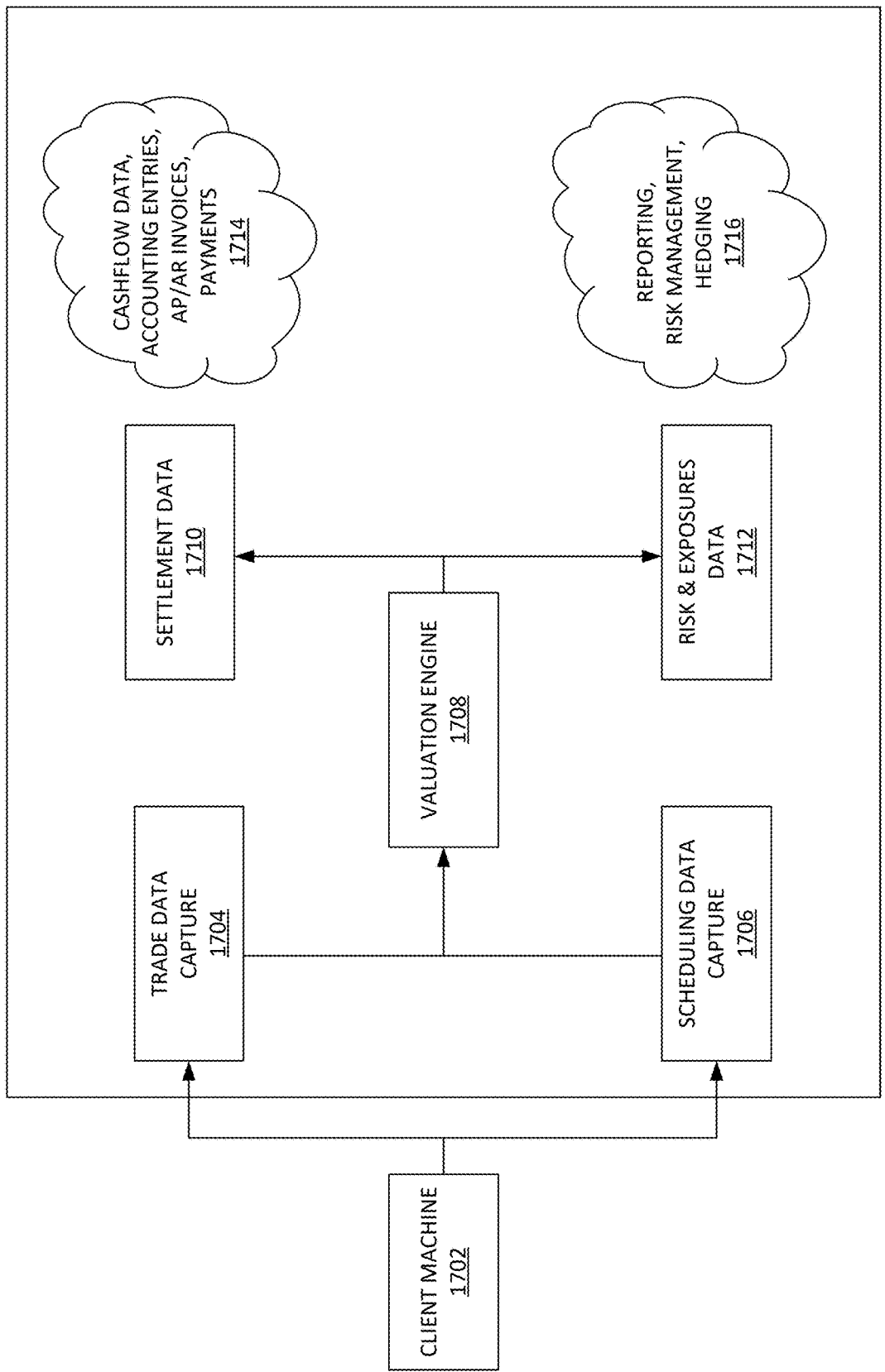
FIG. 17 illustrates an example set of of CTRM enterprise application system functions, according to some embodiments.

FIG. 17 illustrates an example set of of CTRM enterprise application system functions 1700, according to some embodiments. CTRM enterprise application system functions 1700 includes processes 1800-2200. Client machine 1702 can implement a trade data capture 1704. Trade data capture 1704 can be implemented by process 1800.

Figure 18:
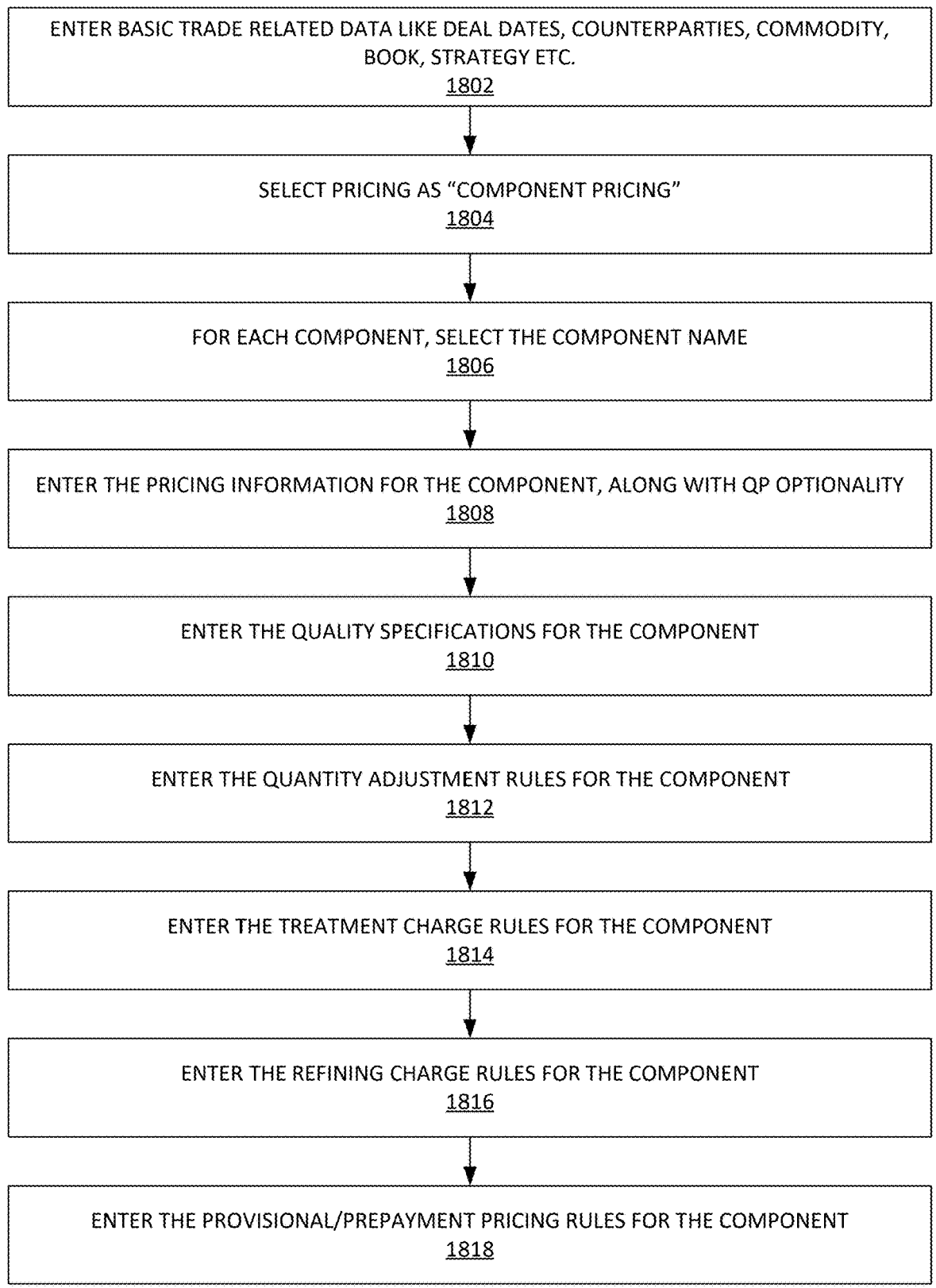
FIG. 18 illustrates an example trade data capture process, according to some embodiments.

FIG. 17 illustrates an example set of of CTRM enterprise application system functions 1700, according to some embodiments. FIG. 18 illustrates an example trade data capture process 1800, according to some embodiments. In step 1802, process 1800 can enable a user (e.g. via client machine 1702, etc.) to enter basic trade related data (e.g. deal dates, counterparties, commodity, book, strategy etc.). In step 1804, process 1800 can enable a user to select pricing as "component pricing". In step 1806, process 1800 can, for each component, enable a user to select the component name. In step 1808, process 1800 can enable a user to enter the pricing information for the component, along with QP optionality. In step 1810, process 1800 can enable a user to enter the quality specifications for the component. In step 1812, process 1800 can enable a user to enter the quantity adjustment rules for the component. In step 1814, process 1800 can enable a user to enter the treatment charge rules for the component. In step 1816, process 1800 can enable a user to enter the refining charge rules for the component. In step 1818, process 1800 can enable a user to enter the provisional/prepayment pricing rules for the component.

Figure 19:
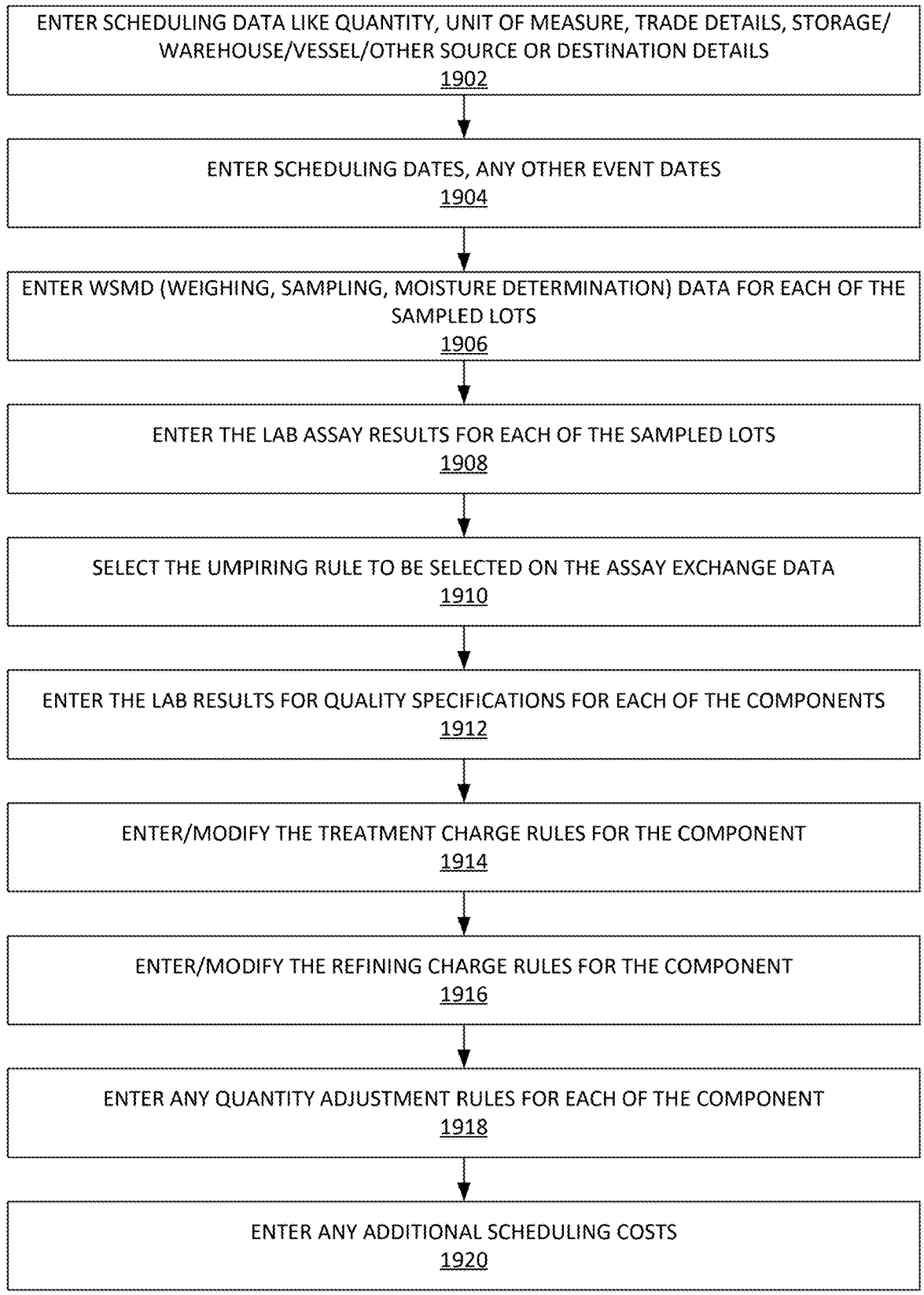
FIG. 19 illustrates an example scheduling data capture process, according to some embodiments.

Returning to process 1700, client machine 1702 can implement a scheduling data capture 1706 process. FIG. 19 illustrates an example scheduling data capture process 1900, according to some embodiments. In step 1902, process 1900 can enable a user to enter scheduling data. Scheduling data can include, inter alia: quantity, unit of measure, trade details, storage/warehouse/vessel/other source, or destination details, etc. In step 1904, process 1900 can enable a user to enter scheduling dates, any other event dates. In step 1906, process 1900 can enable a user to enter WSMD (weighing, sampling, moisture determination) data for each of the sampled lots. In step 1908, process 1900 can enable a user to enter the lab assay results for each of the sampled lots. In step 1910, process 1900 can enable a user to select the umpiring rule to be selected on the assay exchange data. In step 1912, process 1900 can enable a user to enter the lab results for quality specifications for each of the components. In step 1914, process 1900 can enable a user to enter/modify the treatment charge rules for the component. In step 1916, process 1900 can enable a user to enter/modify the refining charge rules for the component. In step 1918, process 1900 can enable a user to enter any quantity adjustment rules for each of the component. In step 1920, process 1900 can enable a user to enter any additional scheduling costs.

Figure 20:
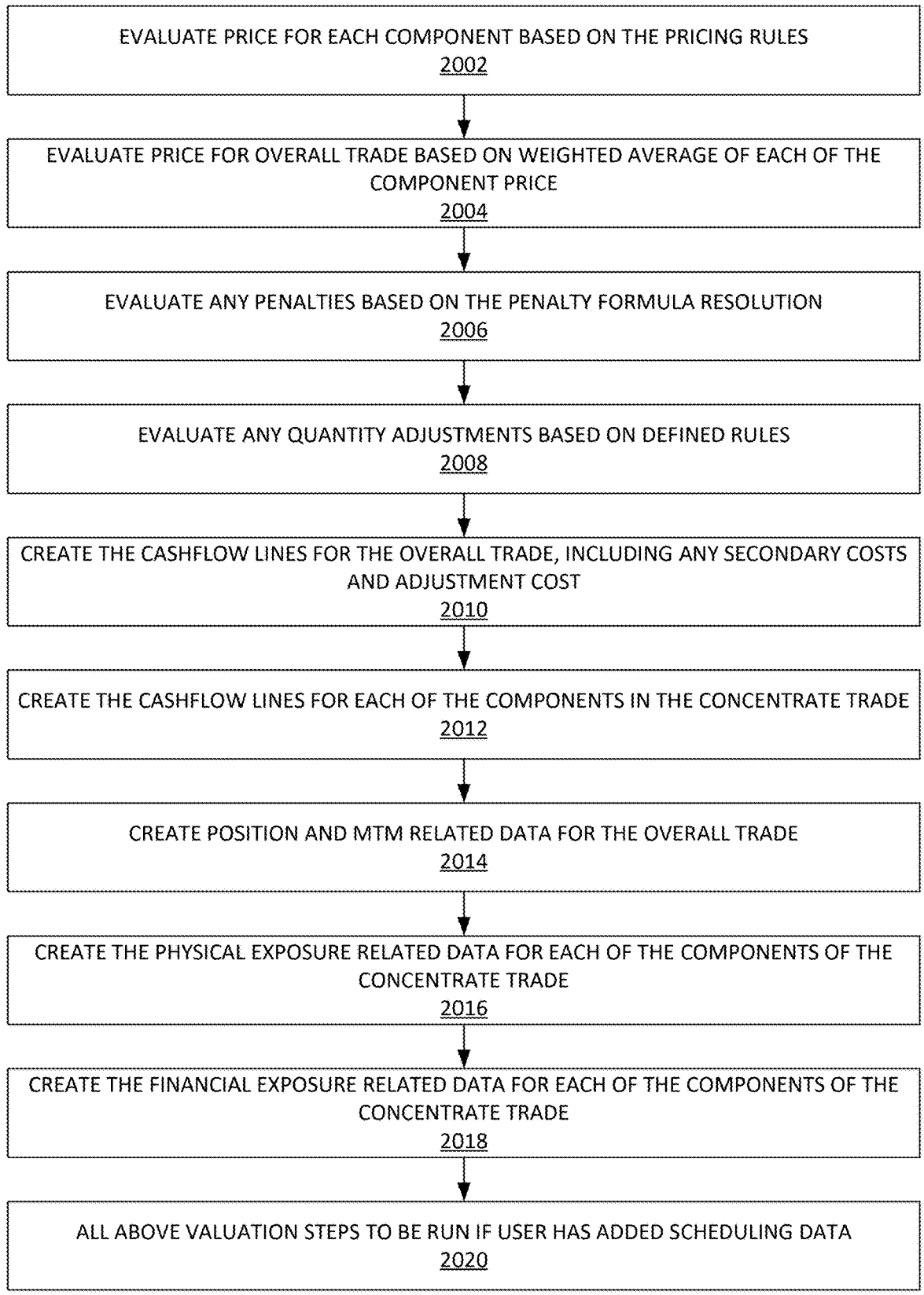
FIG. 20 illustrates an example valuation engine process, according to some embodiments.

Returning to process 1700, client machine 1702 can implement a valuation engine 1708 process. FIG. 20 illustrates an example valuation engine process 2000, according to some embodiments. In step 2002, process 2000 can enable a user to Evaluate price for each component based on the pricing rules. In step 2004, process 2000 can enable a user to evaluate price for overall trade based on weighted average of each of the component price. In step 2006, process 2000 can enable a user to Evaluate any penalties based on the penalty formula resolution. In step 2008, process 2000 can enable a user to evaluate any quantity adjustments based on defined rules. In step 2010, process 2000 can enable a user to create the cashflow lines for the overall trade, including any secondary costs and adjustment cost. In step 2012, process 2000 can enable a user to create the cashflow lines for each of the components in the concentrate trade. In step 2014, process 2000 can enable a user to create position and MTM related data for the overall trade. In step 2016, process 2000 can enable a user to create the physical exposure related data for each of the components of the concentrate trade. In step 2018, process 2000 can enable a user to create the financial exposure related data for each of the components of the concentrate trade. In step 2020, process 2000 can enable a user to run steps 2002-2018 when user has added scheduling data.

Returning to process 1700, CTRM system 1700 can implement a settlement data 1710 process. CTRM system 1700 can implement a risk and exposures data 1712 process. CTRM system 1700 can implement a cashflow data, accounting entries, AP/AR invoices, payments 1714 process. CTRM system 1700 can implement a reporting, risk management, hedging 1716 process.

Figure 21:
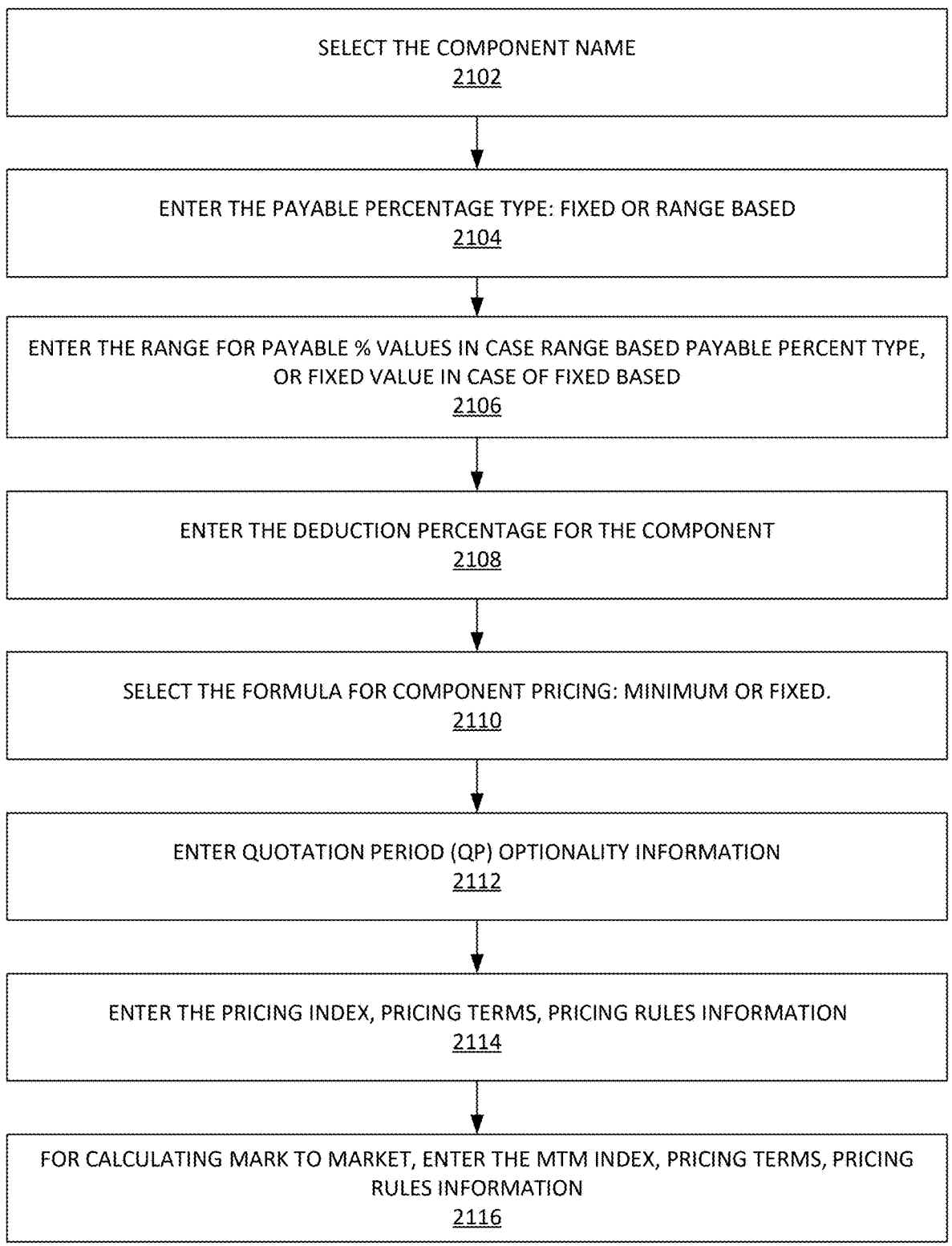
FIG. 21 illustrates an example component pricing information process, according to some embodiments.

FIG. 21 illustrates an example component pricing information process 2100, according to some embodiments. In step 2102, process 2000 can enable a user to select the component name. In step 2104, process 2000 can enable a user to enter the payable percentage type: fixed or range based. In step 2106, process 2000 can enable a user to enter the range for payable % values in case range based payable percent type, or fixed value in case of fixed based. In step 2108, process 2000 can enable a user to enter the deduction percentage for the component. In step 2110, process 2000 can enable a user to select the formula for component pricing: minimum or fixed. In step 2112, process 2000 can enable a user to enter quotation period (QP) optionality information. In step 2114, process 2000 can enable a user to enter the pricing index, pricing terms, pricing rules information. In step 2116, process 2000 can enable a user to for calculating mark to market, enter the MTM index, pricing terms, pricing rules information.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized system for metals testing comprising: with at least one computer processor:
    a commodity risk management (CTRM) enterprise system comprising:
        a firewall comprising a network security system that monitors and controls incoming and outgoing network traffic based on a set of predetermined security rules,
        a gateway comprising a network node configured for interfacing with another network that uses different communication protocols;
    wherein the CTRM enterprise system is configured to implement a set of trade capture and pricing requirements for a metals commodity, wherein the CTRM enterprise system is configured to use a plurality of application server nodes to perform a plurality of tasks comprising:
        managing a complex quality-based contract pricing for the metals commodity;
        calculating and managing a complex formula-based contract penalty with respect to the quality-based contract pricing of the metals commodity; and
        implement a set of microservice modules that independently perform a set of microservice related to the quality-based contract pricing and the complex formula-based contract penalty of the metals commodity,
    wherein each application node comprises a micro services architecture pattern that applies an application business logic that is divided into logical units as one or more micro services,
    wherein each micro service comprises an entire business logic and a related data model, wherein each micro service comprises communicates to each other micro service to perform a cross service business logic, ad wherein each micro service is independent of all other micro services,
    wherein a first micro service comprises a deal micro service configured to manage a set of commodity deals data operations, wherein a second micro service comprises a process service configured to carry out a background processes comprising an end of day processes,
    wherein a third micro service comprises an OPS service configured to manage a physical operations related a set of metal commodity data,
    wherein each micro service is built in a form of an image comprising a self-contained environment to run each micro service, wherein each micro service image comprises a containerized image configured to use a Docker container,
    wherein each container for each micro service image comprises a unit comprising a Kubernetes pod, wherein an application server node comprises a virtual machine that hosts a plurality of Kubernetes pods and utilizes at least one load balancer, wherein the metal commodity comprises one or more base metals, and
    wherein the one or more base metals comprises a one or more ores and metal concentrates, wherein the metal commodity comprises one or more refined metals, wherein the one or more refined metals comprises a one or more ferrous metals, non-ferrous metals, scrap metals, precious metals, and finished metal products.

2. The computerized method of claim 1, wherein the CTRM utilizes a set of pricing types comprising: a fixed pricing type, an index pricing type, a trigger pricing type, a formula pricing type, and a componentized trigger pricing type.

3. The computerized method of claim 2, wherein the quality specifications comprise a moisture FE (Ferrous) content, a Silica content, and an impurities content.

* * * * *